United States Patent
Gleason

[19]

[11] Patent Number: 5,966,663
[45] Date of Patent: Oct. 12, 1999

[54] DATA COMMUNICATIONS PROTOCOL FOR FACILITATING COMMUNICATIONS BETWEEN A MESSAGE ENTRY DEVICE AND A MESSAGING CENTER

[75] Inventor: Thomas G. Gleason, Huntington, N.Y.

[73] Assignee: Ericsson Messaging Systems Inc., Woodbury, N.Y.

[21] Appl. No.: 08/783,176

[22] Filed: Jan. 14, 1997

[51] Int. Cl.[6] ..................................................... H04Q 7/20
[52] U.S. Cl. ..................... 455/466; 455/412; 395/200.33
[58] Field of Search .................................... 455/412, 414, 455/418, 419, 466, 517; 395/200.39, 200.33

[56] References Cited

U.S. PATENT DOCUMENTS

| | | | |
|---|---|---|---|
| 5,461,608 | 10/1995 | Yoshiyama | 370/222 |
| 5,583,914 | 12/1996 | Chang et al. | 455/466 |
| 5,635,918 | 6/1997 | Tett | 455/466 |
| 5,706,211 | 1/1998 | Beletic et al. | 455/466 |

OTHER PUBLICATIONS

Personal Communications Industry Association (PCIA), Washington, DC, "Telocator Data Paging (TDP) Protocol Specification", Version 2.0, Jul. 27, 1995.
Telecommunications Software Systems, Nov. 28, 1994, "SMS—Short Message Peer to Peer (SMPP) Interface Specification".
Vodaphone: Fone Mail—Messaging at your fingertips—the business solution, Press Releases, Oct. 1995–Dec. 1995.

*Primary Examiner*—Edward F. Urban
*Attorney, Agent, or Firm*—Nixon & Vanderhye P.C.

[57] ABSTRACT

A data communications protocol facilitates communications between a message entry device and a messaging center. The protocol permits an operator to enter a message and transmit it quickly, efficiently, and with confirmation. In an example application to short text messaging, two-way data communications between a message entry device and a message handling center, a small set of simple transactional commands is used for communicating messages to and from cellular telephones. Both the message entry device and the message handling center may independently initiate and send messages to the other. An input message is encoded by encapsulating the message between first and second delimiters, e.g., "{" and "}", and associating a message tag with the encapsulated message. Both the message tag and the encapsulated message are in human-readable ASCII format. The delimited message and associated message tag are further encapsulated by additional delimiters to form a protocol data unit with an associated protocol data unit tag. The message handling center simply parses the various delimited fields in accordance with the associated tags. No complicated encoding or decoding procedures are necessary.

34 Claims, 8 Drawing Sheets

FIG. 7
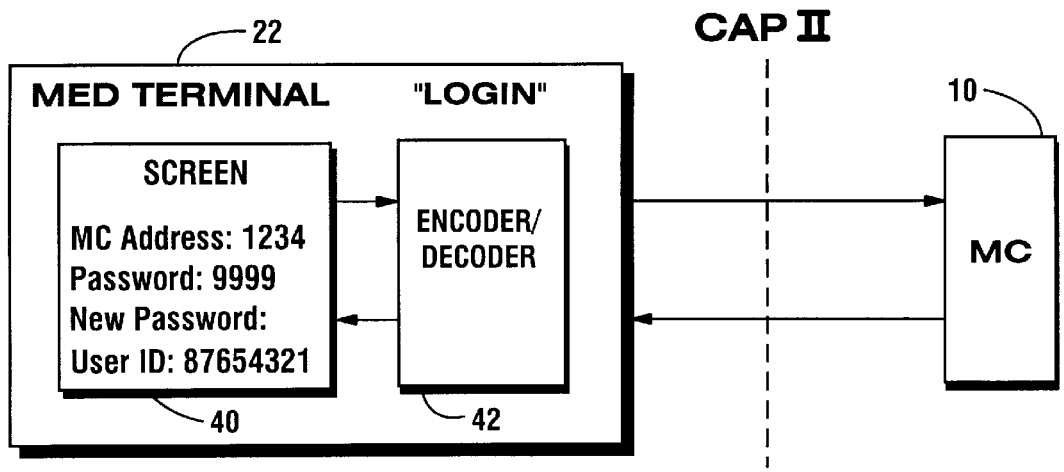
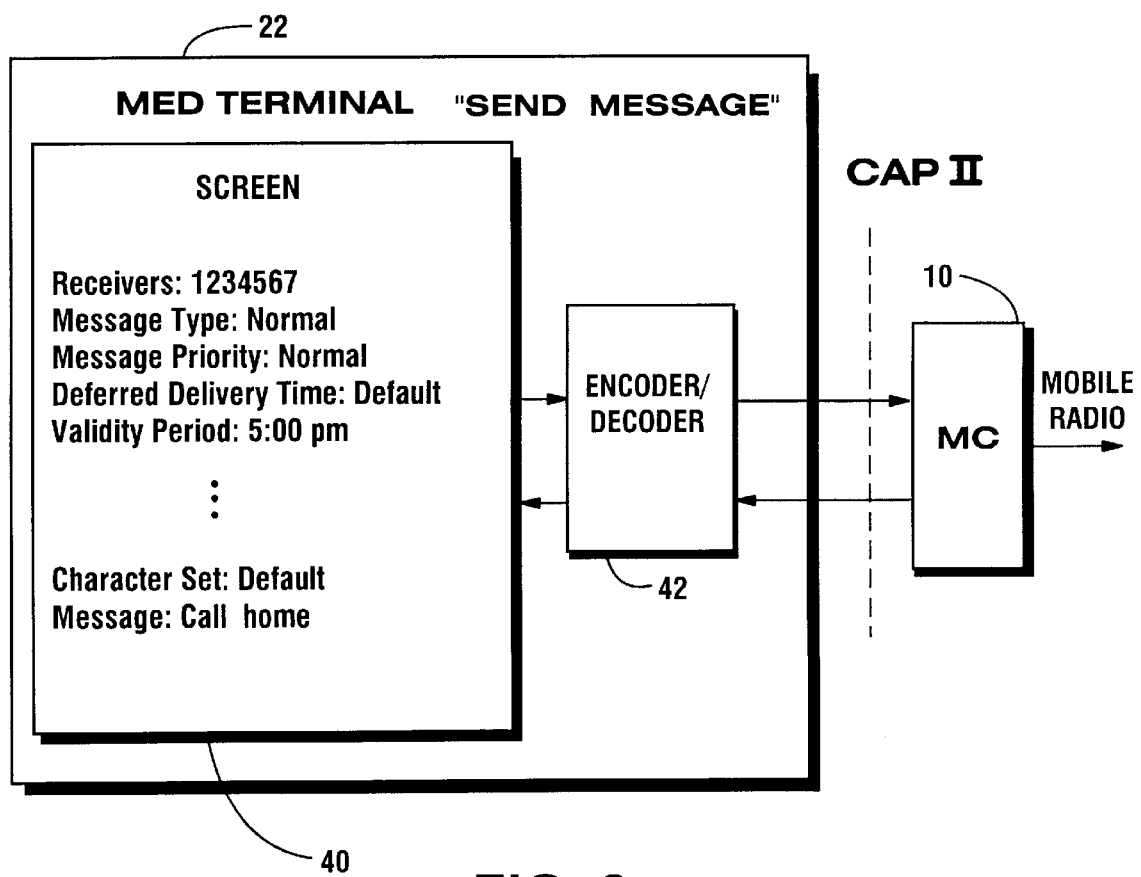
FIG. 8

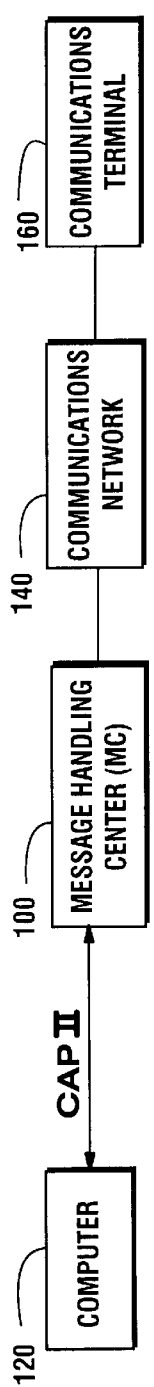
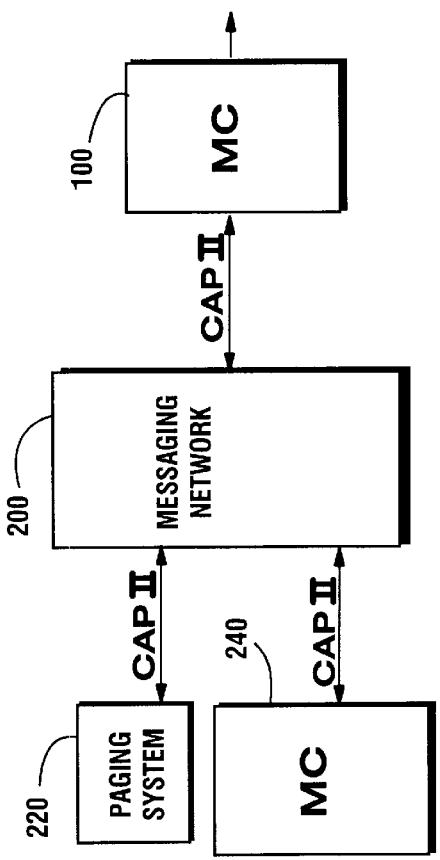
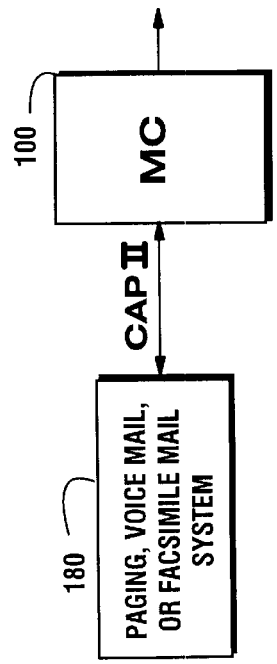
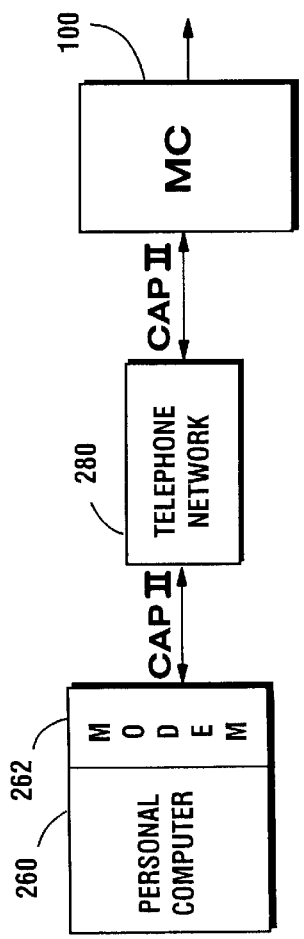
FIG. 9
FIG. 10
FIG. 11
FIG. 12

FIG. 13
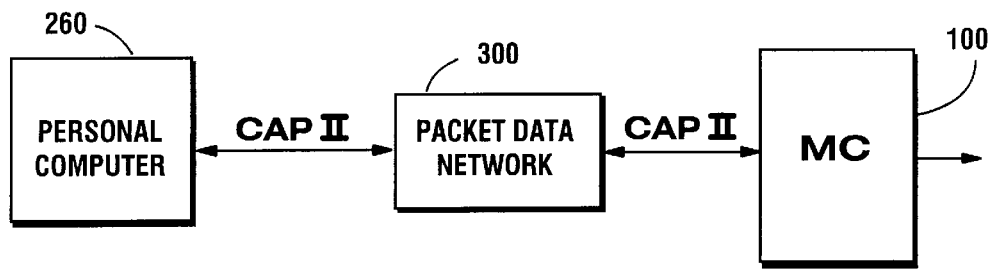
FIG. 14
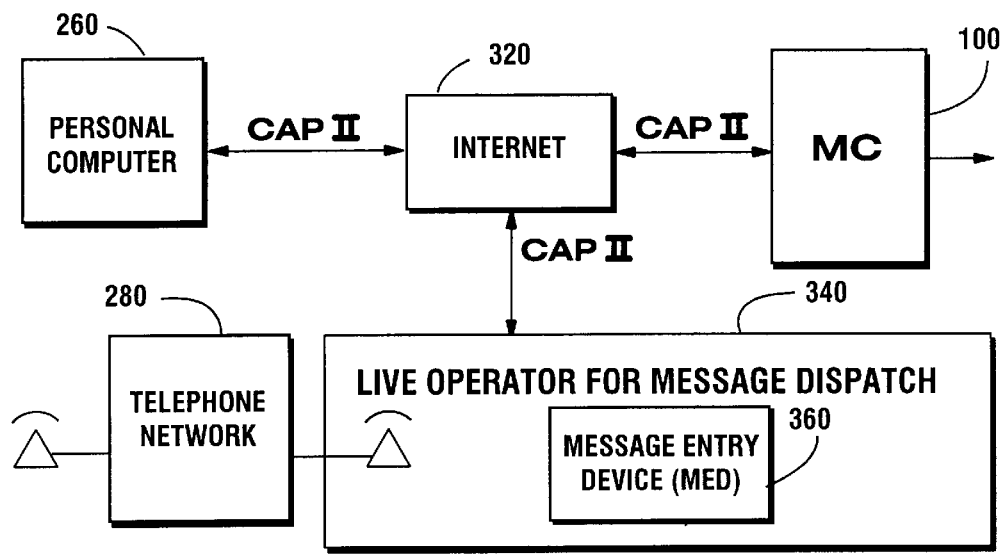
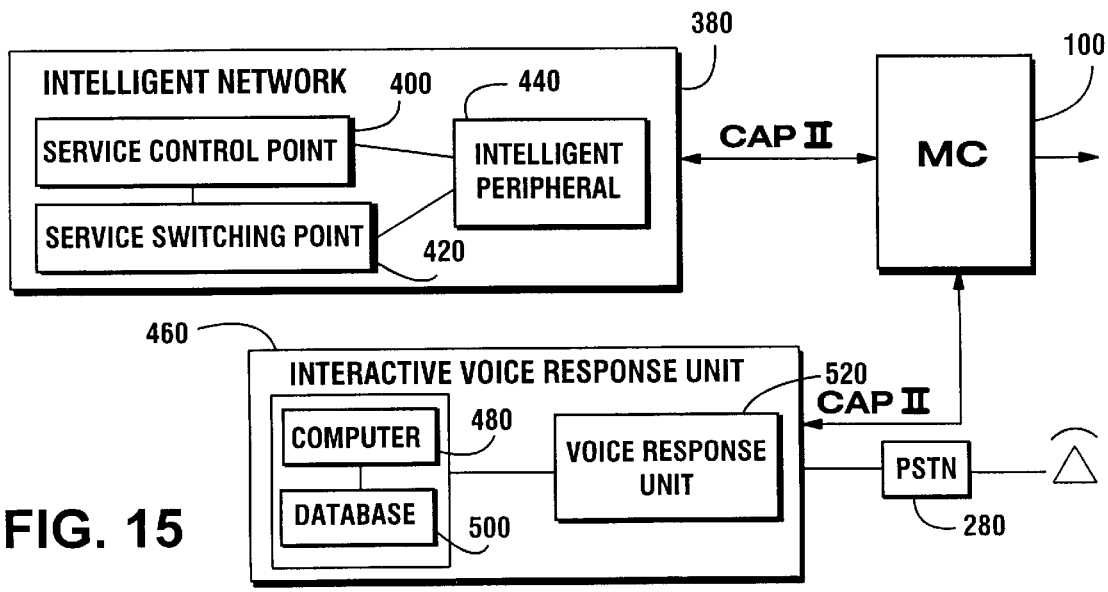
FIG. 15

DATA COMMUNICATIONS PROTOCOL FOR FACILITATING COMMUNICATIONS BETWEEN A MESSAGE ENTRY DEVICE AND A MESSAGING CENTER

FIELD OF THE INVENTION

The present invention relates to data communications protocols, and more particularly, to a data communications protocol for facilitating communications between a message entry device and a message handling center.

BACKGROUND AND SUMMARY OF THE INVENTION

There are a plethora of data communications protocols most of which were developed to meet a specific set of communication needs. For example, so-called "messaging" protocols were proposed and developed in the 1980's to address certain messaging applications like e-mail, phone mail, etc. The X.400 series of recommendations advanced by CCITT define one messaging protocol. Another more recent example of a data communications protocol is version 2.0 of the Telecator Data Paging (TDP) protocol specification recently published in 1995 by the Personal Communications Industry Association (PCIA). The TDP protocol suite is a set of communications protocols to provide data paging capabilities and is designed to support wireless one-way transmission of any type of binary data from an input device to a remote computer device via radio paging channels. As a result, different types of computers, Personal Digital Assistants (PDAs), and other portable devices can receive information transmitted over radio paging channels. Such information might be spreadsheet information, database updates, digitized fax, voice or video data, computer programs, or any other type of digitally encoded data. TDP was also designed in the hopes of supporting two-way paging applications for wireless devices like pagers and cellular phones where a paged device may return a response to the wireline or wireless message origination device.

In actuality, the TDP protocol suite includes a number of individual protocols including: a data input protocol known as the Telecator Message Entry (TME), a radio transport protocol known as Telecator Radio Transport (TRT), a radio receiver to remote computer data transfer protocol known as Telecator Mobile Computer (TMC), a Telecator Network Paging Protocol (TNPP) or Telecator Interswitch Paging Protocol (TIPP) utilized to move radio transmission data from one paging terminal to another, Telecator Format Conversion (TFC) used by a front end processor to send binary data through a port compatible with the Telecator Alpha-numeric Protocol (TAP), and a Wireless Message Format (WMF) which describes the format in which binary input data may initially be presented to a paging terminal. Ultimately, binary data initially sent from a Message Entry Device (MED) to a remote Mobile Computer Device (MCD) is expected to appear in the wireless message format for delivery to a pager.

The Telecator Message Entry (TME) protocol specifies certain rules for moving information between the MED and a paging network. The protocol expects entry device to "log in" to the paging system and possibly identify who the caller is, along with the specification of an optional password. For a particular set of binary data to transmit, one or more remote receivers may be specified so that the paging systems may forward the received data to the proper set of paging terminals which cover the geographic region where data transmission is to take place. Other TME control blocks allow input devices to define parameters such as the delivery priority, which specifies the desired time period within which the entire set of binary data should be transmitted.

The architecture of many data communication protocols follows the International Standards for Organization (ISO) structure for "layered protocols" beginning with an applications layer that defines the structure of the data and the control blocks which are transferred between two communicating devices. The application layer also defines the format of responses expected when control blocks are transferred. A transport layer defines how each application layer and control block is broken down into one or more packets so that they may be reliably moved between systems. The network routing layer defines how individual packets of the transport layer are properly directed to move between the two communicating devices if these devices are not directly connected to each other. The data link layer defines the structure of the data as it appears on a communications link. The data link layer defines how data bytes are represented so they are not confused with control information and how "check-sum" information is added to transmitted data so that the receiving data link layer software can detect transmission errors. Finally, the physical layer represents the physical hardware and driver control software which transmits and receives data bits over a communications circuit. To transfer message data, each layer in the stack performs its particular processing functions, advancing the processed information to the next layer in order to ultimately transmit data bits over the physical communications channel. When data is received on the channel, the process is reversed.

The particular layer of interest to the present invention is the application layer which defines communications procedures, data, and control structures used to move data and define control parameters between two devices. Two well known example applications that run on top of the application layer are electronic mail and electronic file transfer. Another example application of interest to the present invention is the transfer and delivery of short text messages between a message entry device and a messaging handling processor for delivery to a mobile radio terminal.

Generally, the structure of existing applications layers and the format of the control blocks are formally and rigidly defined by protocol notation known as Abstract Syntax Notation (ASN.1). ASN.1 is a formal language having a complex, encoded representation whose precise, formal nature removes any possible ambiguities from both representation and meaning. For example, instead of saying that a variable contains an integer value, a protocol designer who uses ASN.1 must state the exact form and range of the numeric values. More generally, ASN.1 defines precisely how to encode both names and data items in a message.

Unfortunately, ASN.1 has numerous and significant drawbacks including complexity, inflexibility, and high expense. The following is an example of just how complex it is just to log-in and confirm the log-in (before a message is even sent) using the TME protocol using ASN.1.

```
// ASCII Representation of a Login Invoke PDU
value LoginArgument::=
{
    loginID subscriberID: "tme_test",
    tmeVersion
    {
        majorVersion 2,
        minorVersion 0
    }
    password "password"
}
// ASN.1 Representation of the Login Invoke PDU
LoginArgument SEQUENCE [fieldcount (not encoded) = 3]
    loginID LoginId CHOICE [index = 0]
        suscriberId SubscriberId Character String [length = 8.0]
            "tme_test"
    tmeVersion TmeVersion SEQUENCE [fieldcount (not encoded) = 2]
        majorVersion INTEGER [length = 1.0]
            2
        minorVersion INTEGER [length (not encoded) = 0.4]
            0
    password Password Character String [length = 8.0]
        "password"
Total PDV length = 22.0
// An ASN.1 Encoded output of the Login Invoke PDU
TDPTypes CHOICE [index = 0]
    invoke SEQUENCE [fieldcount (not encoded) = 3]
        invokeID InvokeID CHOICE [index = 0]
            present INTEGER [length = 1.0]
                1
        opcode Code CHOICE [index = 0]
            local INTEGER [length = 1.0]
                1
        argument OpenType [length = 22.0]
            0x4070746d655f7465737401010100706173737776f7264
Total PDV length = 29.0
// Login Response PDU enclosed in a ROSE envelope.
TDPTypes CHOICE [index = 1]
    returnResult SEQUENCE [fieldcount (not encoded) = 2]
        invokeId Invoke Id CHOICE [index = 0]
            present INTEGER [length = 1.0]
                1
        result SEQUENCE [fieldcount (not encoded) = 2]
            opcode Code CHOICE [index = 0]
                local INTEGER [length = 1.0]
                    1
            result OpenType [length = 63.0]
0x40010100153139399363131303530393439323302e392d30353030002357656c636f6d6d65 . . .
Total PDV length = 70.0
// Login Result after decoding-ASN.1 format.
LoginResult SEQUENCE [fieldcount (not encoded) = 3]
    tmeVersion TmeVersion SEQUENCE [fieldcount (not encoded) = 2]
        majorVersion INTEGER [length = 1.0]
            2
        minorVersion INTEGER [length (not encoded) = 0.4]
            0
    systemConfigDateTime GeneralizedTime [length = 21.0]
        19961105094920.9-0500
    carrierNewsflash Character String [length = 35.0]
        "Welcome to the Message Center [TME]"
Total PDV length = 63.0
Received PDU:2
// Login Result ASCII representation.
value LoginResult::=
{
    tmeVersion
    {
        majorVersion 2,
        minorVersion 0
    },
    systemConfigDateTime "19961105094920.900-0500",
    carrierNewsflash "Welcome to the Message Center [TME]"
}
```

From the above, it is plain that encoding a simple message just to deliver a login ID and password is amazingly complex.

Another problem with existing data communications protocols is they are increasingly antiquated. Current and future telecommunications systems require more comprehensive and more readily integratable features. For example, data are increasingly being sent over cellular digital packet data (CDPD) systems. Accordingly, for a message handling system to effectively interface with the CDPD system it must provide new services and features currently in demand but also must have the flexibility to adapt to and provide future communications needs.

A current example of a mobile data system/wireless computer network is the Public Land Mobile Network (PLMN). In such a network, mobile units such as cellular telephones may communicate with other mobile units through the PLMN or with stationary wireline units through more conventional wireline type networks such as the Public Switch Telephone Network (PSTN), the Internet, etc. More and more applications of mobile data systems require two-way communication to and from the mobile, wireless terminals. Even a relatively simple courier or taxi radio dispatch system where couriers/cabs are dispatched for a package pick-up should provide some return acknowledgment or confirmation message.

Unfortunately, many existing protocols are not well suited for such two-way data communications. For example, standardized protocols like the Telecator Data Paging (TDP) protocol suffer a number of limitations and drawbacks when messaging system designers and programmers try to put them into practice. Specifically, the TDP suite of protocols is directed and based on old paging protocols and paging networks and is not well directed to the special current needs, e.g., two-way data/text communications, of wireless mobile terminals or cellular telephones. Being directed to paging networks, TDP is not well suited to provide short text messaging services (SMS). SMS requires a much more flexible, comprehensive, and easily-used protocol to facilitate message transfer between a messaging service/operator and a message handling center for ultimate routing messages to and from a cellular telephone. In addition, the TME paging network controller permanently functions as the "server." "Client" devices are required to poll the network controller server to retrieve messages. It would be desirable to permit a messaging center to function both as a server and as a client that could independently initiate and send messages without first being polled. Another problem with the TME protocol is that its message delivery mechanism requires the use of a directory command which causes a list of message IDs to be sent to the client. Thereafter, the client must "pull" messages from the network server using a message reference. Such a message delivery approach is complex to implement because the number of messages is indeterminate. What is needed is a simple message delivery request mechanism that can be readily implemented and used.

Increasing demands for more capability and flexibility in communications protocol are further complicated by the need to keep portable radio terminals simple, small, and inexpensive. Because cellular telephones are already very small devices (and will get only smaller), they have limited amounts of memory and data processing capability. Because cellular telephones are battery-operated, power conservation is at a premium. As a result, cellular telephones are powered-off for long time periods. Another factor pertains to the fact that while some messages are for the human user of the cellular telephone, some messages are intended only for a computer located in the cellular telephone itself. For example, the telephone computer uses short messages for authentication, for activation or deactivation of cellular telephone features, etc. Factors like these make cellular telephone message delivery, confirmation, and origination quite challenging. Accordingly, a data communications protocol designed to optimally meet these challenges is needed.

Consider the following, real world situation where a telephone network operator provides a call answering service which permits a subscriber to call a special message service telephone number to have a text message delivered to a cellular telephone. After dialing the call answering service, the caller dictates over the phone a message which is typed into a message entry device by a human operator and sent on to a message handling center. The message handling center routes the message via the Public Land Mobile Network (PLMN) to the cellular telephone over a radio channel.

What is needed in this situation is a data communications language, i.e., protocol, that is easy for an operator to enter the message and transmit it quickly, efficiently, and with confirmation. The protocol should permit the cellular telephone to acknowledge whether and when the message is successfully delivered and stored in the memory of the cellular telephone. The protocol must also adapt to the fact that, as mentioned above, cellular telephones are often turned-off, and as a result, there may be a large number of unsuccessful message delivery attempts. So the protocol should permit an operator to replace a message that may not have been successfully delivered, stored, or retrieved by or during a certain time frame. The originating caller should also be able to receive a notification message if the original message could not be successfully delivered within the specified time period.

Priority of messages is also an important feature in delivering messages to and from cellular telephones since radio bandwidth is a precious resource. Given the limited memory of the cellular telephone, another desired feature is the ability to erase messages after a certain time to open up storage for new messages. The caller may also be interested in determining the status of the message, e.g., whether the message has been received, read, etc. Other features that must be accommodated for short messages delivered to cellular telephones are variable message length capability and transmission to multiple destinations, e.g., multiple cellular telephones.

Of course, an important feature in a two-way messaging system is sending a message or other notification report from the messaging center to the message entry device. This "reverse" communications direction is not typically found for example in traditional paging systems. What is needed is a protocol that permits messages to be sent just as easily from a message handling center to an operator as from an operator to a message handling center without any special alerting function or polling operation.

As already described, a major problem with existing protocols is the use of very complicated encoding procedures, i.e., ASN.1 encoding. In addition, ASN.1 requires that an operator provide information for every required field. This is often inconvenient and unnecessary when certain fields do not apply for a particular message. In any event, ASN.1 transcoders are quite expensive, difficult to program against, complex to implement, and complex to debug. An encoding technique is needed that provides an unambiguous representation of communication variables, that is also easily understood by humans, and that is easy to decode. Moreover, the operator should not have to remember and be proficient with many different commands to program new features or new applications that are to run on top of this protocol. Programming new features or service elements should be straightforward, and the protocol should not be adversely impacted by inevitable changes and expansions in communications services.

The present invention provides a new protocol which meets these needs and overcomes these and other drawbacks with existing communications protocols. The protocol in accordance with the present invention employs a small set of simple transactional commands to effect communications between two computers and finds particularly advantageous application to short text message, two-way data communications between a message entry device and a message handling center for communicating messages to and from cellular telephones. Therefore, the protocol finds particular application to Public Land Mobile Networks (PLMN). The new protocol in accordance with the present invention, referred to as Computer Access Protocol (CAP II), is an application layer protocol which is independent of underlying layers. As such, the CAP II protocol may be used "on top of" standard lower layer protocols such as TCP/IP or X.25.

CAP II defines a client-server model where the client is the entity which establishes the connection, and the server is the entity to which the connection is established. Both the message entry device and the message handling center may function as a client and as a server. In this regard, CAP II is symmetrical in that communicating devices function as "peers," and there is no need for special alerts or polling by one device to receive messages from another device. Communicating devices may function in one communication as a "server" and in another as a "client." Human-readable, ASCII Protocol Data Units (PDUs) are exchanged between client and server.

Message encoding is easy to implement and use. An input message is encapsulated by a message entry device between first and second delimiters, e.g., "{" and "}", and a message tag is associated with the encapsulated message. Both the message tag and the encapsulated message are in human-readable, ASCII format. The delimited message and associated message tag are further encapsulated by, i.e., "nested" in, additional delimiters with one or more corresponding tags to form a protocol data unit that also has an associated protocol data unit tag. Message decoding is also easy. The receiving unit, e.g., a message handling center, receives binary symbols corresponding to the transmitted PDU and converts those received binary symbols into ASCII format. The resulting PDU is then parsed using the delimiters and associated tags to unpack the message. This parsing process is readily performed because the delimiters are easily detected and each tag identifies the content of the delimited information with which the tag is associated. Accordingly, no complicated encoding or decoding procedures are necessary.

In the particular application of the CAP II protocol to messaging services provided by a messaging handling center for processing messages between a message entry device and portable radios such as cellular telephones, the message handling center provides a plurality of messaging services including storing messages in electronic form and forwarding specific messages to destination devices under prescribed conditions. A mobile radio communications network connected to the message handling center includes several radio base stations for communicating voice and data call information over radio channels with portable radios within each radio base station's range. A message service center receives calls from persons who want to deliver text messages to portable radios. A human operator at the message service center enters a text message via a message entry device connected to the message handling center. The message entry device includes a data processor for encoding the text message and associated control information using the delimiters and delimiter tag described above to generate PDUs which are transmitted to the message handling center. The message handling center receives the PDUs, parses out the various field information and message tags, and delivers the text message to the appropriate portable radio by way of the mobile radio network and radio base station in accordance with the control information.

Significantly, the message handling center also receives messages generated by portable radios by way of the mobile communications network. A data processor in the message handling center encodes the radio text message and any related control information using the delimiter/tag encapsulation method described above to generate one or more PDUs which are transmitted to the message entry device. When the message entry device receives the PDUs, it parses out the text messaging control information using the delimiters and tags.

One of the message entry device and message handling center initiating a communication connection between the message entry device and message handling center is defined as a client and the other is defined as the server. Either the message entry device or the message handling center may independently initiate a communications connection as the client. A set of human-readable transaction commands is used by the client and server to transmit information over the established communications connection. Each transactional command includes a transaction request PDU sent from the client which initiates the transaction and a transaction confirm protocol data unit sent from the server which confirms whether the transaction request is successful. Some of the transactions may be marked to indicate that they include plural PDUs thereby binding the plural PDUs to the same transaction.

The set of human-readable transactional commands includes a BIND transaction used by the client to initiate a communications session between the client and server to permit plural transaction request PDUs and transaction confirm PDUs to be exchanged during the communications session. An UNBIND transaction is used to end the communications session. The set of transactions further includes a SUBMIT transaction initiated by the client to submit a message to the server, a DELIVER transaction initiated by the client to retrieve to message from the server; a REMOVE transaction initiated by the message entry device to delete a message stored in the message handling center; a REPLACE transaction initiated by the message entry device to replace a message stored in the message handling center; an INQUIRE transaction initiated by the client to inquire about the status of an earlier submitted message.

Many of the transaction commands include plural parameter fields encoded and decoded using corresponding tags and delimiters. Each parameter specifies a particular operation to be performed with respect to a submitted message. For example, plural destination addresses may be specified to transmit a PDU to plural different destinations. A deferred delivery time may be employed to specify when an attempt should be made to transmit the message. A priority may be associated with the message to control the order in which the message is transmitted, with higher priority messages being transmitted before lower priority messages. A message expiration time may be attached to the message after which expiration no further attempts will be made to transmit the message. A message delivery status may be used to inform the device submitting the message whether the message was successfully delivered, and if not, the reason for the failed delivery. A confirmation parameter indicates whether confirmation PDUs should be suppressed in order, for example, to facilitate transmission of long messages. A transaction reference is assigned by the originator of the transaction request. The transaction request is used to match a pending transaction request with a received transaction confirm. Other parameters include a maximum transaction window that represents the maximum number of outstanding transaction requests pending a confirmed transaction.

These and other objects, advantages, and features of the present invention will now be described in more detail below in conjunction with the drawings.

BRIEF DESCRIPTION OF THE DRAWINGS

FIGS. 7 and 8 are example display screens showing entry of message information used in sending a short message from a message entry device to the message handling center in accordance with the CAP II protocol;

FIG. 9 shows an example embodiment where the CAP II protocol is used in a communication system to facilitate a message communication between the computer and the message handling center;

FIG. 10 shows an example embodiment where the CAP II protocol is used in communications between paging, voice mail, or facsimile mail systems and a message handling center;

FIG. 11 shows an example embodiment of the CAP II protocol applied to communication between a paging system and plural message handling centers via a messaging network;

FIG. 12 shows an example embodiment of the CAP II protocol applied to communications from a personal computer via the telephone network to a message handling center;

FIG. 13 shows an example embodiment of the CAP II protocol applied to communications between a personal computer and a message handling center by way of a packet data network;

FIG. 14 shows an example embodiment of the CAP II protocol applied to communications between a live operator for message dispatch and message handling center via the Internet; and FIG. 15 shows an example embodiment of the CAP II protocol applied to communications between an intelligent network and/or interactive voice response unit with a message handling center.

DETAILED DESCRIPTION OF THE INVENTION

In the following description, for purposes of explanation and not limitation, specific details are set forth, such as specific components, interfaces, techniques, etc. in order to provide a thorough understanding of the present invention. However, it will be apparent to one skilled in the art that the present invention may be practiced in other embodiments that depart from the specific details. In other instances, detailed descriptions of well-known methods, devices, and circuits are omitted so as not to obscure the description of the present invention with unnecessary detail.

Figure 1:
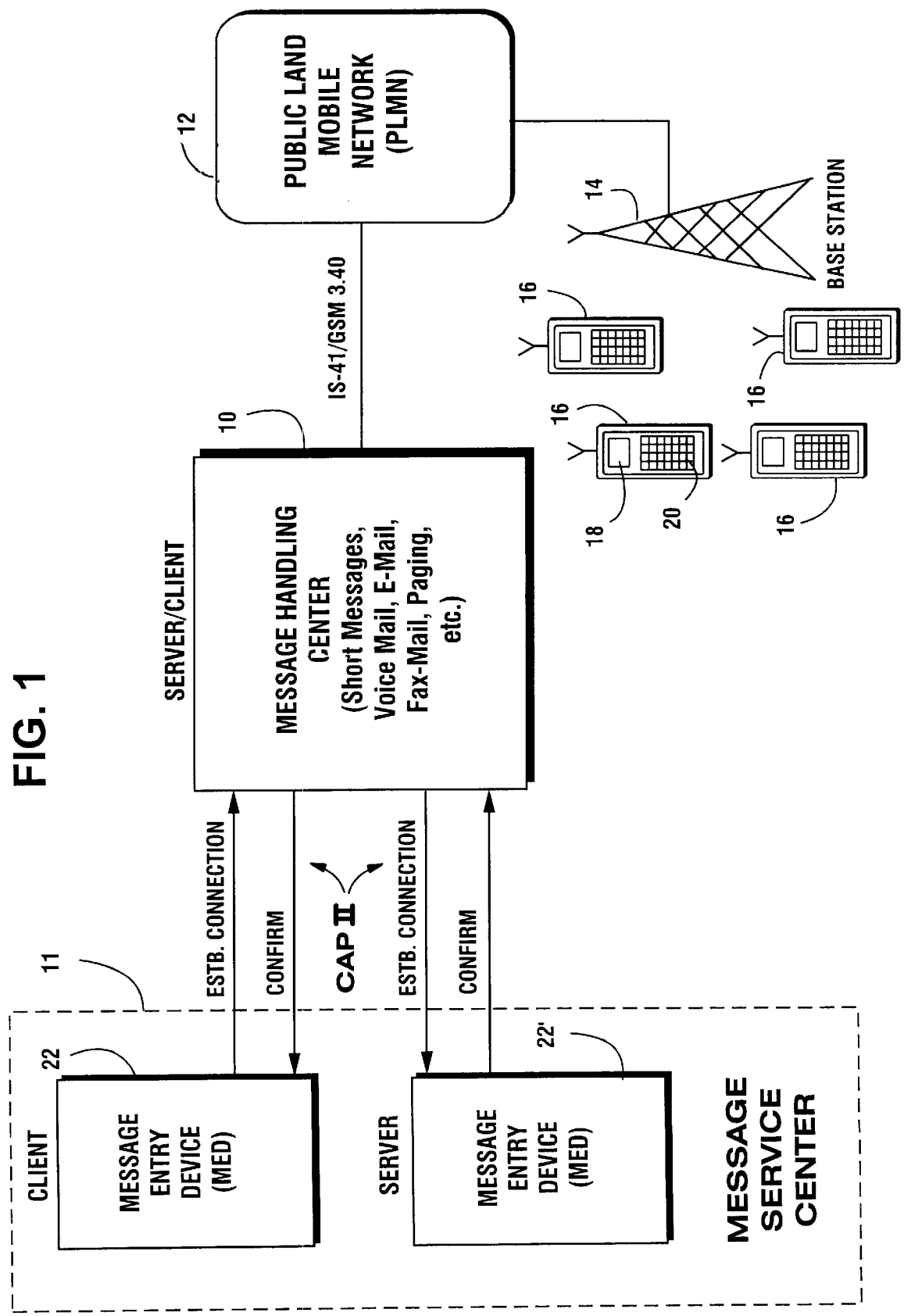
FIG. 1 is a schematic representation of an example telecommunications system in which the present invention may be implemented.

The present invention relates to a protocol in accordance with the present invention is identified for simplicity as computer access protocol or simply CAP II. FIG. 1 shows an example, non-limiting application of the present invention. However, those skilled in the will appreciate that the CAP II protocol can be used in other applications as well. For purposes of this application, a protocol is defined as a set of rules and conventions that allow a processing entity to specify or understand communication without knowing the details of a particular network hardware. A protocol is to computer communication what program and languages are to computation. Moreover, a message handling center is a system that performs a variety of functions including message storage, retrieval, forwarding, modification, delay, replacement, etc. These functions of the message handling system can be applied to E-Mail, voice mail, facsimile mail, etc.

Since the CAP II protocol has as one advantageous application the transmission of short messages to mobile radios, the present invention is described in some detail in the context of such an example, non-limiting application. A network operator operates a message service center 11 that includes plural Message Entry Devices (MEDs) 22 and 22' connected to a message handling center (MC) 10 which interfaces with Public Land Mobile Network (PLMN) 12. The Public Land Mobile Network 12 is connected to various mobile switching centers (not shown) which are each in turn connected to a plurality of base stations, each base station corresponding to a geographical coverage area or cell. Base station 14 transmits voice and control information via radio channels to mobile radios 16. Each mobile radio includes in addition to radio signal and data processing hardware and software, a limited size display 18, and keypad 20. Limited size display 18 is used to display relatively short messages, e.g., on the order of 160 characters or less, and keypad 20 is used by a cellular telephone operator to enter relatively short data messages to the message handling center 10 via base station 14 and PLMN 12. The message center 10 stores the short message and forwards it to the destination under conditions prescribed by the message entry device, e.g., when the mobile radio is present and able to receive the short message.

Two message entry devices 22 and 22' shown in FIG. 1 may correspond for example to computer terminals used by live operators for message dispatch operation. Such a live operator dispatch system will generally be established by a network operator to provide short messaging services to subscribers. For example, a caller may contact a live operator and request that a short message be delivered to a particular mobile radio at a certain date and time with the caveat that the message is only valid up until a certain date and time. Other functions/features that are supported by the message handling center 10 and supported by the CAP II protocol include for example replacing an old message not yet delivered to the mobile radio with a new message, replacing a message already delivered to the mobile radio with a new message, deleting a message not yet delivered to the mobile radio, identifying that a message is not intended for display to a human operator but rather is a message for the cellular telephone computer, identifying that a message is intended to activate or deactivate a visual or audible indicator on a cellular telephone (e.g., a small picture of a mailbox on the phone display to indicate that a voice mail message is waiting to be retrieved), etc.

Message communications between the mobile radios 16 and the public land mobile network (PLMN) 12 are controlled by international standard protocols like the European GSM standard, GSM 3.40 for short message services, the American Standard IS-41 for short message services, etc. Of course, other standard radio interfaces may be employed as well. The CAP II protocol easily maps the message and its control parameters to and from these standardized protocols. For example, information in the CAP II protocol language is mapped to an appropriate format recognized by the cellular telephone system, e.g., GSM. A specific example would be that the text data in CAP II identified as TDATA is easily mapped to GSM:User Data. Advantageously, the CAP II protocol is readily used by operators of the message entry device without using complicated and expensive encoding tools like ASN.1 encoders that generate messages generally not readable by humans according to an inflexible format. Such complexity and inflexibility make it difficult for operators to add new messaging features and services.

One area of flexibility of the CAP II protocol is two-way messaging. The message entry device 22 may function as the "client" with the message handling center 10 functioning as the message receiving "server." In that instance, the message entry device 22 initially establishes a connection to transmit a message, and in response, the message handling center 10 sends a message to the client MED 22 confirming when that connection has been established. Conversely, the message handling center 10 can function as the "client" and directly establish a connection with MED 22' which is then functioning as the server. Such a connection can be directly and immediately established without requiring an alerting or polling function. In that instance, MED 22' functions as the server and confirms to the message handling center 10 when a connection is established.

Figure 2:
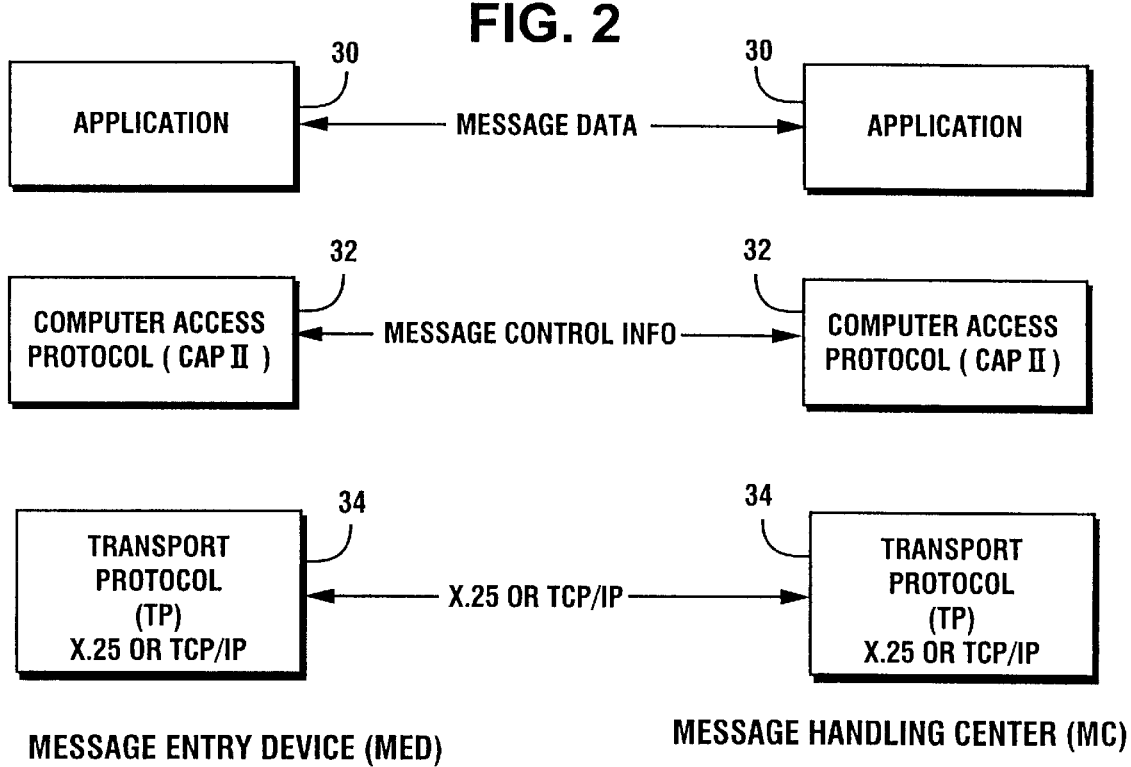
FIG. 2 is a schematic representation of a layered protocol structure of the computer access (CAP II) protocol in accordance with the present invention.

FIG. 2 illustrates the "layered architecture" of the CAP II protocol. As "lower level" applications layer protocol, CAP II operates on top of a Transport Protocol (TP) layer 34 which performs functions and procedures used to set up and release "point-to-point connections" between the MED 22 and the message handling center 10. An example transport protocol might be TCP/IP or X.25. As is well-known in the art, TCP/IP is a standard transport protocol that provides reliable, full duplex, stream service on which many application protocols depend. TCP allows a process in one machine to send a stream of data to a process on another machine. It is connection-oriented in the sense that before transmitting data, the participating machines must establish a connection. Software implementing TCP usually resides in the operating system of each machine and uses the IP protocol to transmit information across the underlying Internet. The somewhat similar CCITT standard protocol for transport level network service is the reliable stream transmission service X.25 most popular in Europe and Japan.

At the next layer, the Computer Access Protocol II (CAP II) 32 functions just below the actual application and provides for the composition, sending, and parsing of messages, e.g., short messages (SM), including user data (i.e. the substantive message to be conveyed), and related message control information. As will be described in more detail below, CAP II takes advantage of the services provided by the transport protocol 34. The actual application 30 supported by CAP II may be for example any messaging application where user messages are generated including short messages, voice mail, E-mail, fax mail, paging, etc.

In a short text message environment such as that shown in FIG. 1, the basic functions of the message entry device 22 include: (1) log-in, (2) submit messages to the message handling center 10, (3) retrieve stored messages from the message handling center 10, and (4) receive delivered messages from the message handling center 10. The functions of the message handling center 10 include (1) storing messages, and (2) forwarding messages to destination devices according to message control information parameters submitted from the message originating device and/or according to mailbox specific parameters for mail application. As already mentioned, CAP II permits both the message entry device 22 and message handling center 10 to each function as a client and a server. This kind of symmetry is advantageous because no polling or alerting functionality is required for either device to send a message. As a result, the message handling center can confirm receipt, delivery, or the lack thereof without having to wait for a formal request for confirmation from the message entry device.

Further features supported by CAP II advantageous to messaging applications are described below. CAP II permits the retrieval of individual messages from the message handling center as well as deletion of messages that have not yet been delivered to the intended recipient, e.g., a mobile radio. CAP II further supports message replacement so that a message not yet delivered to a mobile radio can be replaced with a new one, if appropriate. Another CAP II function is inquiry into the status of a particular message. Message inquiry is supported by the message handling center's ability to independently establish a connection to the message entry device to immediately send a message receipt confirmation and notification report. Still another function supported by CAP II is submitting and delivering messages to multiple addresses where the message handling center receives such requests and makes sure that destinations on the list all receive the message. CAP II further supports a continuation of previous message transaction so that messages of varying length can be readily handled.

CAP II provides various service parameters useful in controlling the delivery of messages between the MED and the destination mobile radio via the MC, some of which are highlighted below. One parameter is a validity period which specifies the latest time in which message delivery from the message handling center should be attempted. A protocol identifier indicates how a message should be handled in the destination mobile radio, e.g., replacing an earlier transmitted message, etc. A priority parameter indicates the priority of the message and if the message should be attempted to be delivered even if the destination mobile radio is absent or otherwise unavailable, e.g., the mobile radio is turned off. A notification request parameter is used to request a report of the delivery status of an earlier transmitted message. A message type parameter indicates if the message is a simple message or a complex message. A deferred delivery time parameter indicates a time at which the first attempt should be made to deliver the message. A data coding scheme parameter indicates the coding of user data, i.e., ASCII coding or 8-bit data transfer. Because the CAP II protocol is written in ASCII format, it is human readable, easy to diagnose, and eliminates the need for complex PDU decoders typically required to analyze and debug protocols implemented at a message entry device.

The CAP II protocol takes advantage of several services provided by the underlying transport protocol. Some of the messages between the CAP II protocol and the transport protocol have mandatory parameters and other parameters are optional. Optional fields, as will be described further below, permit ready expansion of the protocol to include new features and services while still remaining "backward compatible" with existing implementations of the protocol. Perhaps the most fundamental of messaging procedures is that of establishing a connection between the client and the server, where again either a message entry device (MED) or the messaging center (MC) can be the client or the server for a transaction. In any event, the client is defined as the connection establisher and is the entity requesting a service from the communications network. That connection can be generally understood as the path between the client and the server to transfer information. The server is then defined as the connection recipient and receives the call/request from the client.

Figure 3:
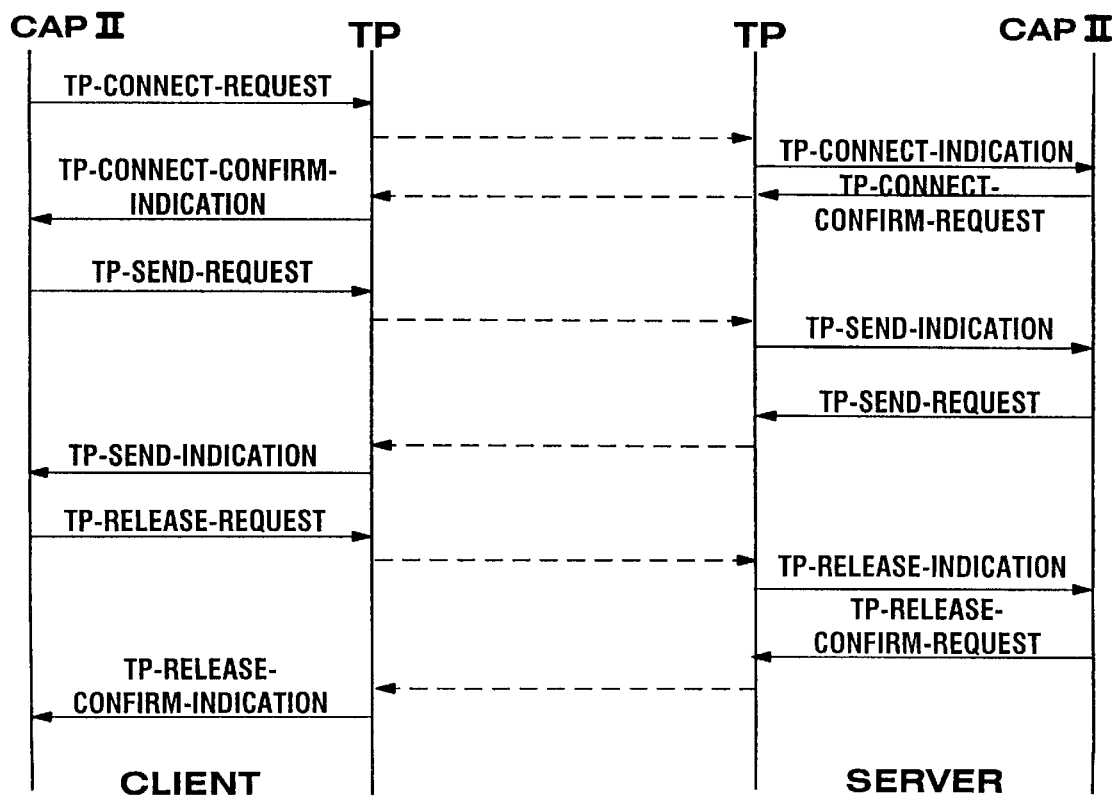
FIG. 3 is a signaling diagram used to represent example control signals transmitted between client and server in the setting up and release of a communications connection in accordance with the CAP II protocol.

The signaling diagram shown in FIG. 3 illustrates example control signals involved in setting up a connection between client and the server. In order to establish a connection, a connect request is made from the CAP II to the transport protocol (TP) to request a set up of a point-to-point connection from the client to the server. Since the call will be routed in accordance with the called party number over the transport network, the connect-request must include a called party number parameter and may optionally include a calling party number parameter. The connect-indication signal is used by the transport protocol on the server side to indicate to the CAP II that a request for connection is received. As with the request, the indication may optionally include the calling party number. The connect-confirm request is then issued by CAP II on the server side to confirm establishment of the connection from the client to the server. The connect-confirm request may optionally include the connected party number. The connect-confirm indication is used by the transport protocol on the client's side to indicate to the CAP II that the connection between the client and the server is established and may also optionally include the connected party number. If the transport protocol cannot successfully establish a connection, a connect-error indication is issued to indicate that an error has occurred along with the reason why it was not possible to establish the connection. Accordingly, the connect-error indication includes a cause information parameter.

After establishing a connection, the next major communication process is that of gathering, "packaging," and transferring user data. As shown in the middle of FIG. 3, a send-request is issued by CAP II to the transport protocol (TP) on either the client or server's side to send user message data. Accordingly, the send-request includes as a mandatory parameter user data. The send indication is used by the transport protocol to indicate to the CAP II that user data is received. The send-error indication is used by the transport protocol to report to the CAP II that the transport protocol could not successfully transfer the user data and may also indicate that the connection is released. The send-error indication also specifies the reason why the transfer user data was not successful.

Release of the connection between the client and the server may be initiated either by the client or the server. The release-request is used by CAP II to request the release of the connection between client and server and includes cause information as an optional parameter. A release indication is then used by the transport protocol to indicate to the CAP II that a request for release of a connection has been received. It could also optionally include a cause information parameter. The release-confirm request is used by the receiving client or server to acknowledge the reception of the release indication, and the connection between the client and server is released. Again, the cause information may be included as an optional parameter. Finally, a release-confirm indication is used by the transport protocol to indicate to the CAP II that the connection between the client and server has been released using cause information as an optional parameter.

Once a connection is established via the transport, network routing, data link, and physical layers, a message can be sent in accordance with CAP II. CAP II defines communications procedures and control structures to establish and move information between the client and server, e.g., the MED and the MC.

In other communications protocols, the structure of the applications layer and the format of its control blocks are rigidly defined using Abstract Syntax Notation (ASN.1). The appropriate parameters required by the user and defined by this notation are placed within control blocks whose structure is also defined with the OSI standards. As a result, standard protocols that require ASN.1 and expensive ASN.1 transcoders are not particularly easy to implement or use, e.g., recall the simple example set forth in the background section above. It is also very difficult to implement currently desired message services using such rigid and complex formats let alone add new functions and features to messaging applications like short messages to/from cellular telephones. In contrast, the CAP II protocol provides an easy to use, flexible, and inexpensive-to-implement protocol that also allows implementation of currently desired services and permits easy addition of future services as they arise.

The CAP II protocol is transactionally-based. A message transaction between clients and server is accomplished using an exchange of Protocol Data Units (PDUs). At every transaction request, the originating device adopts an unused transaction identifier used to identify that transaction at both the client and server. Each transaction's life is defined by request and confirm commands. CAP II supports nine basic transactional commands: BIND, UNBIND, SUBMIT, DELIVER, DELETE, REMOVE, REPLACE, and INQUIRE. The device which originates the transaction command PDU request stores each PDU including its TRAN until a "confirm PDU" is received including the same TRAN number. After a completed transaction, the TRAN value is released.

Many times a transaction involves several request/confirm exchanges; the most common example is the submission of a message. To accommodate several request/confirm exchanges, CAP II defines "sessions" initiated by the client using a BIND transaction. The BIND PDU establishes a session between the client and server. Before the BIND transaction can be issued, the connection between the client and the server must have already been established as described above in connection with FIG. 3. Accordingly, the client allocates a TRAN number for the request and then issues a Request PDU. The Request PDU includes a specific "DONE" parameter that is helpful in managing a transaction. If DONE is set to "NO," the server knows to keep the transaction alive to receive additional PDUs. In this way, messages of variable lengths are easily accommodated.

After issuing the Request PDU, the client waits for a Confirm PDU. These steps are repeated for each Request PDU until the last PDU for the session is completed. At that point, the DONE parameter is set equal to "YES." A window parameter is also provided which indicates the number of outstanding requests pending Confirm PDUs. For half duplex transport, the window size is equal to 1 so that all outstanding requests must be confirmed. For simplicity, the following description assumes that the window parameter is set equal to 1 with the understanding that other values could also be supported to improve communication efficiency.

Thus, a client opens a session by sending a BINDRequest PDU to the server. CAP II also includes a number of parameters used to monitor message exchanges. When a BINDRequest PDU is sent to the server, a Time Request Sent (TRS) timer is started. The client then waits for the BINDConfirm PDU from the server. When the client receives the BINDConfirm PDU, the client initiates release of the connection by sending the transport protocol release-request command. The release of the connection also indicates if the session "opening" process has been aborted. If a send-error indication is received, there was an error in the transmission network. The send-error indication transport message includes a cause value indicating the reason for the failure.

When the server receives the BINDRequest PDU for opening a session, the actual user data corresponding to the message is passed by the CAP II to the server's end application for validation. The validation result is sent with a BINDConfirm PDU from the server to the client to indicate the successful or unsuccessful establishment of the session. Another timer referred to as the Time Confirm Sent (TCS) is initiated at successful establishment of the session. If no PDUs are received by the server before timer TCS times out, the server initiates release of the connection via the transport protocol release request command. If a send-error indication is received, there was an error in transmission with the send-error indication including a cause value providing the reason for failure. Upon receipt of this indication, the BIND session is aborted, and timer TCS is halted.

Coupled with the BIND transaction is the UNBIND transaction. The UNBIND transaction closes a session between client and server, and like the BIND transaction, is initiated from the client. The client closes a session by sending an UNBINDRequest PDU to the server. The Timed Request Sent (TRS) session timer is started. When the client receives the UNBINDConfirm PDU from the server, the result parameter indicates a successful or unsuccessful closing of the session, and the TRS timer is halted. If session closing was successful, the client initiates the release of the connection by sending the release-request transport protocol command. If a response is not received before timer TRS expires, the client initiates release of the connection by sending the release request. If the send-error indication is received, an error occurred in transmission, the cause value indicating the reason for failure, session timer TRS, and the client initiates release of the connection.

When the server receives the UNBINDRequest PDU for closing the session, the PDU user data is passed by CAP II to the end application for validation. The result of that validation is then sent in an UNBINDConfirm PDU from the server to the client indicating successful or unsuccessful closing of the session. Time Release Request (TRR) timer is initiated at successful closing of the session. If a new BINDRequest PDU is not received by the server before the time out of timer TRR, the server initiates release of the connection by sending the release-request. If the send-error indication is received, there was an error in the transmission with the cause value indicating the reason for failure. The server then initiates release of the connection by sending the release-request command to the transport protocol layer.

The SUBMIT transaction is the mechanism by where the client sends a message to the server. However, before SUBMIT PDUs can be transmitted, a client-server connection must be established as described in conjunction with FIG. 3 above, and the session must be opened between the client and the server using the BIND transaction. Two different SUBMIT procedures may be used: one procedure for a single message and another procedure for plural messages. The parameters DONE and No Confirmation (NOCNF) are used to control which procedure to use. As described above, setting DONE equal to NO indicates that more PDUs are to follow, and DONE set equal to YES indicates the last PDU for this transaction. The parameter NOCNF set equal to NO indicates that every SUBMITRequest PDU must be confirmed. When setting NOCNF equal to YES indicates that the SUBMITRequest PDU need not be confirmed.

The SUBMITRequest PDU includes two parameter fields identified by corresponding "tags" DSEQ and TDATA. Parameter Destination Sequence (DSEQ) specifies the ultimate message entity that is to receive the message. The actual message content in human-readable, ASCII format is included in the Text Data (TDATA) field. When the SUBMITRequest PDU is sent, the session timer TRS is initiated, and the client waits for the SUBMITConfirm PDU from the server. When the client receives the SUBMITConfirm PDU, the session timer TRS is halted if the SUBMITRequest PDU is to be confirmed, i.e., NOCNF equals "NO." However, if NOCNF equals "YES," the TRS timer is restarted when the next SUBMITRequest PDU is sent. The result parameter in the SUBMITConfirm PDU indicates successful or unsuccessful submission of the message to the server. If no response is received before timer TRS expires, the client initiates release of the connection by sending a release-request via the transport protocol. Similarly, if a send-error indication is received, the client initiates release of the connection by sending a release-request, and the timer TRS is halted.

When the server receives a SUBMITRequest PDU, the user data (including the message recipient and the text message), is passed to the end application for validation. The timer TCS is stopped if NOCNF equals NO and restarted if NOCNF equals YES. A SUBMITConfirm PDU is sent from the server to the client with the result of the message submission, and session timer TCS is started. If NOCNF equals YES, the TCS is started when the last message is submitted. If a send-indication is received, the client initiates release of the connections by sending a release-request, and timer TCS is stopped. If no new PDUs are received by the server before the expiration of timer TCS, the server initiates release of the connection.

Figure 4A:
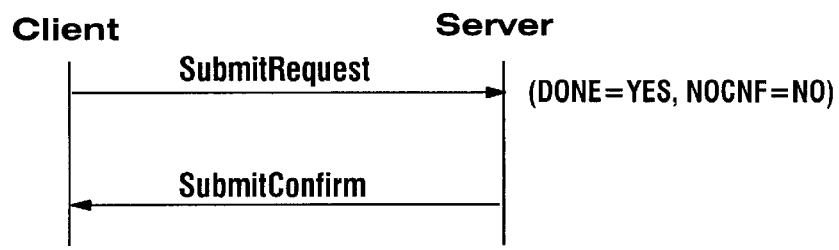
FIGS. 4(a)–4(d) are signaling diagrams used to illustrate example control signaling between client and server communication devices related to the SUBMIT command in accordance with the CAP II protocol.
Figure 4B:
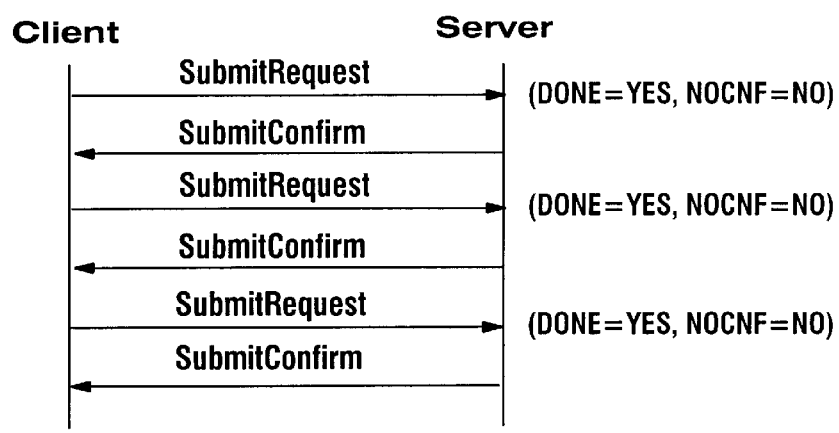
Figure 4C:
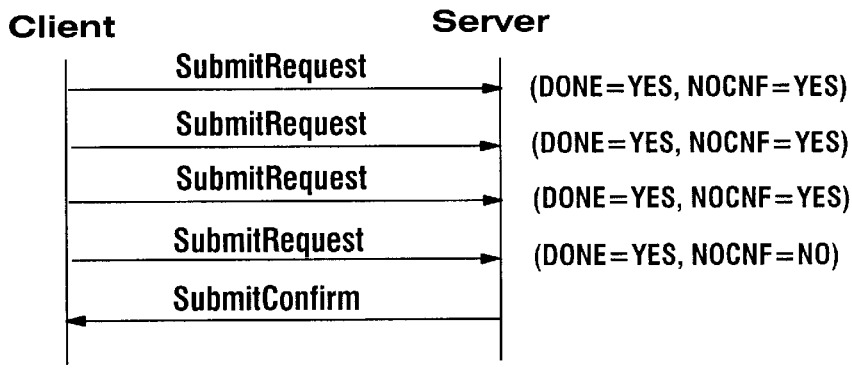
Figure 4D:
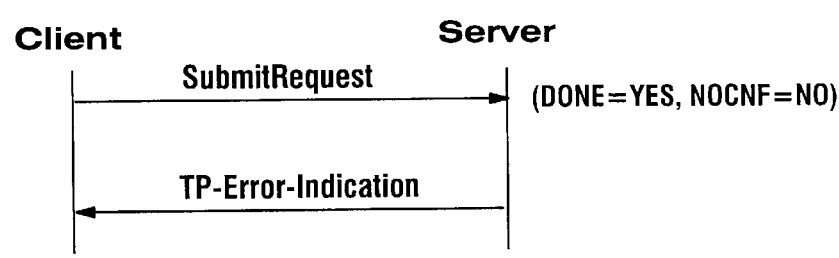

Example SUBMIT signaling sequences will now be described in conjunction with FIGS. 4(a)–4(d). FIG. 4(a) illustrates submission of one message. FIG. 4(b) shows submission of multiple messages (3) with confirmation of every SUBMIT PDU. FIG. 4(c) illustrates submission of multiple messages (4) with confirmation of only the last PDU. FIG. 4(d) illustrates the submission of one unsuccessful message with an error indication control signal being forwarded via the transport layer.

A DELETE transaction is used to delete a message stored for example at the message handling center 10. The DELETE transaction may be implemented using either of two procedures: a DELETE procedure and a REMOVE procedure. Generally, the DELETE procedure is used to delete a message in a local messaging center. The REMOVE procedure deletes a message in a local or remote message handling center. The DELETE procedure uses a message reference (MREF) parameter to identify the message to be deleted. The REMOVE procedure uses the parameters MREF, DSEQ, and an originator information sequence OSEQ to identify a message in the message handling center.

A DELETERequest PDU is used by the client to delete a message from the local message handling center, and a session timer TRS is started. When the client receives the DELETEConfirm PDU from the server, session timer TRS is halted with the parameter result indicating a successful or unsuccessful deletion of the message. If the DELETEConfirm PDU is not received before timer TRS expires, the client initiates release of the connection by sending the transport protocol release-request command. If a send-error indication is received, the client also initiates release of the connection and stops timer TRS.

When the server receives the DELETERequest PDU, the user data is passed to the end application for validation, and the timer TCS is halted. A DELETEConfirm PDU is sent from the server to client with the Result parameter, and session timer TCS is started. If no new PDUs are received by the server before the expiration of timer TCS, the server initiates release of the connection by sending the TP release-request command.

The REMOVE transaction is used by the client to delete a message from the local or remote message handling center. When the REMOVERequest PDU is sent from the client, the session timer TRS is started. Parameters MREF, DSEQ and OSEQ are used to identify the message to be deleted. At the server, a REMOVEConfirm PDU is sent to the client. The various timers and error indications described above with respect to the DELETE transaction are also applicable to the REMOVE transaction.

The DELIVER transaction is used by the client to retrieve messages from the server. One example is retrieval of messages from the message handling center by the message entry device. The server delivers the PDUs making up the DELIVERConfirm message one by one. The client can request to have all message PDUs delivered with confirmation or without confirmation. The parameters NOCNF and DONE are used to control the procedure as described for the SUBMIT transaction.

The DELIVERRequest PDU is sent by the client to retrieve a message from the server. When the DELIVERRequest PDU is sent, the session timer TRS is started. A message type Parameter MTYPE indicates the type of message being delivered, e.g., normal, delivery notification, distribution list, etc. When the client receives the DELIVERConfirm PDU from the server, session timer TRS is halted if NOCNF equals NO. However, if NOCNF equals YES, timer TRS is restarted. The Result Parameter indicates successful or unsuccessful retrieval of the message as well as indicates if this is the last message to be retrieved. If no response is received before the timer TRS expires, the client initiates release of the connection by sending a release-request. Similarly, if a send-error indication is received, the client also initiates release of the connection and stops timer TRS.

When the server receives the DELIVERRequest PDU, the user data in that PDU is passed to the application layer for validation, and the timer TCS is halted. A DELIVERConfirm PDU is sent from the server to the client with the result of the RETRIEVE request including the message to deliver to the client. Session timer TCS is started if NOCNF equals NO. If NOCNF equals YES, the session timer is started when the last DELIVERConfirm PDU is sent to the client. A DELIVERConfirm PDU with Result=LAST MESSAGE indicates that the last message is retrieved. If there was an error in transmission or if no new PDUs are received by the server before the expiration of timer TCS, the server initiates release of the connection by sending the release-request command.

Figure 5A:
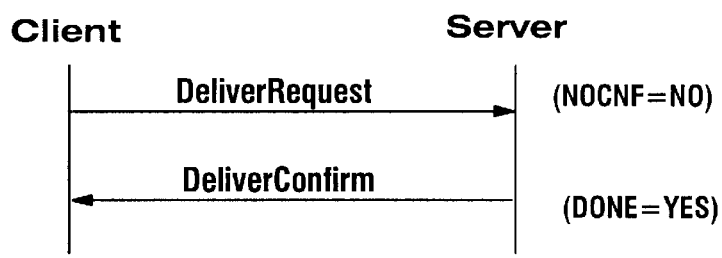
FIGS. 5(a)–5(d) are signaling diagrams used to illustrate example control signaling between client and server communication devices for the DELIVER command in accordance with the CAP II protocol.
Figure 5B:
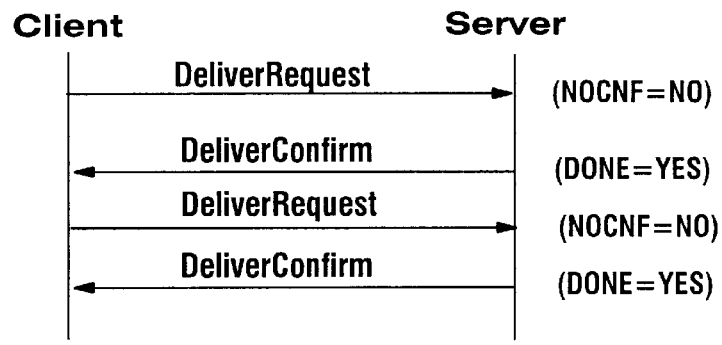
Figure 5C:
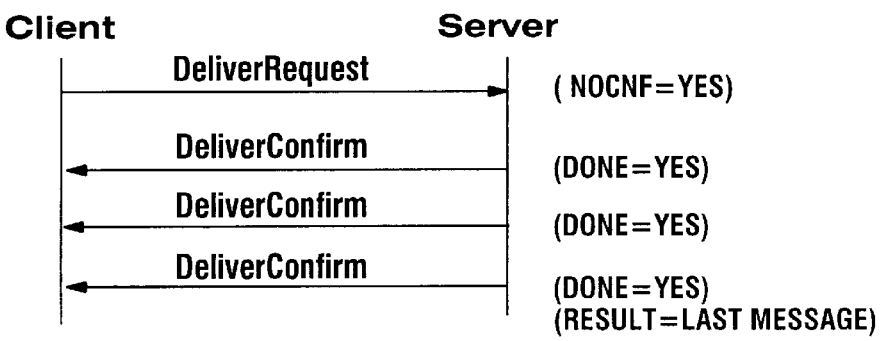
Figure 5D:
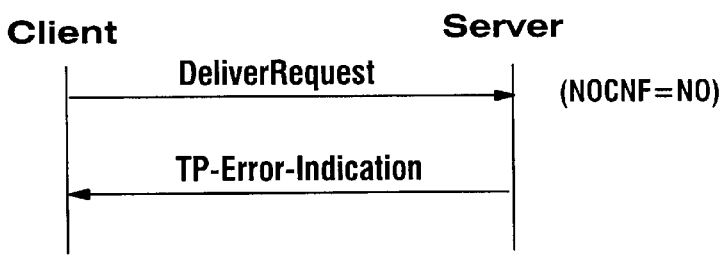

Reference is now made to FIGS. 5(a)-5(b) which illustrate various DELIVER control signaling sequences. FIG. 5(a) illustrates the successful delivery of one message. FIG. 5(b) illustrates the delivery of plural messages (2) with confirmation of each PDU. FIG. 5(c) illustrates the delivery of plural messages with no confirmation of PDUs. One DELIVERRequest yields one DELIVERConfirm. One SUBMITRequest yields one SUBMITConfirm. However, the SUBMITRequest may have specified several destinations (i.e., multiple DSEQ's—destination sequences) or distribution lists. As a result, the SUBMITConfirm may include many SUBMITResult sequences (SSEQ). FIG. 5(d) illustrates the unsuccessful delivery of a message with the transport protocol error indication message.

The INQUIRE transaction is initiated by the client to determine the status of a previously submitted message. The parameter MREF is used to identify the message whose status is to be checked. The client sends an INQUIRERequest PDU, and the session timer TRS is started. When the client receives and INQUIREConfirm PDU from the server, the session timer TRS is halted. If a response is not received before timer TRS expires, client releases the connection by sending a released request. Of course, if a send-error indication is received, the client also initiates release of the connection and the TRS timer is stopped. When the server receives the INQUIRERequest PDU, the user data is passed up to the end application for validation, and the timer TCS is stopped. An INQUIREConfirm PDU is then sent from the server to the client with the result of the INQUIRERequest, and the session timer TCS is started. If a send-error indication is received or if no PDUs are received by the server before expiration of timer TCS, the server initiates release of the connection.

The REPLACE transaction is used to replace an existing message with a new message. The REPLACE transaction is similar to the SUBMIT transaction except that the MREF parameter is included to identify the specific message to replace. The client sends a REPLACERequest PDU to the server, and session timer TRS is started. Parameters MREF, DSEQ, and OSEQ are used to identify the message to be replaced. When the server receives the REPLACERequest PDU, the user data is passed to the end application for validation, and the timer TCS is stopped. A REPLACEConfirm PDU is sent from the server to the client with the result, and the session timer TCS is started. If a send-error indication is received, the client initiates release of the connection by sending the elease-request, and the timer TCS is stopped. If no new PDUs are received by the server before expiration of timer TCS, the server also initiates release of the connection.

Figure 6:
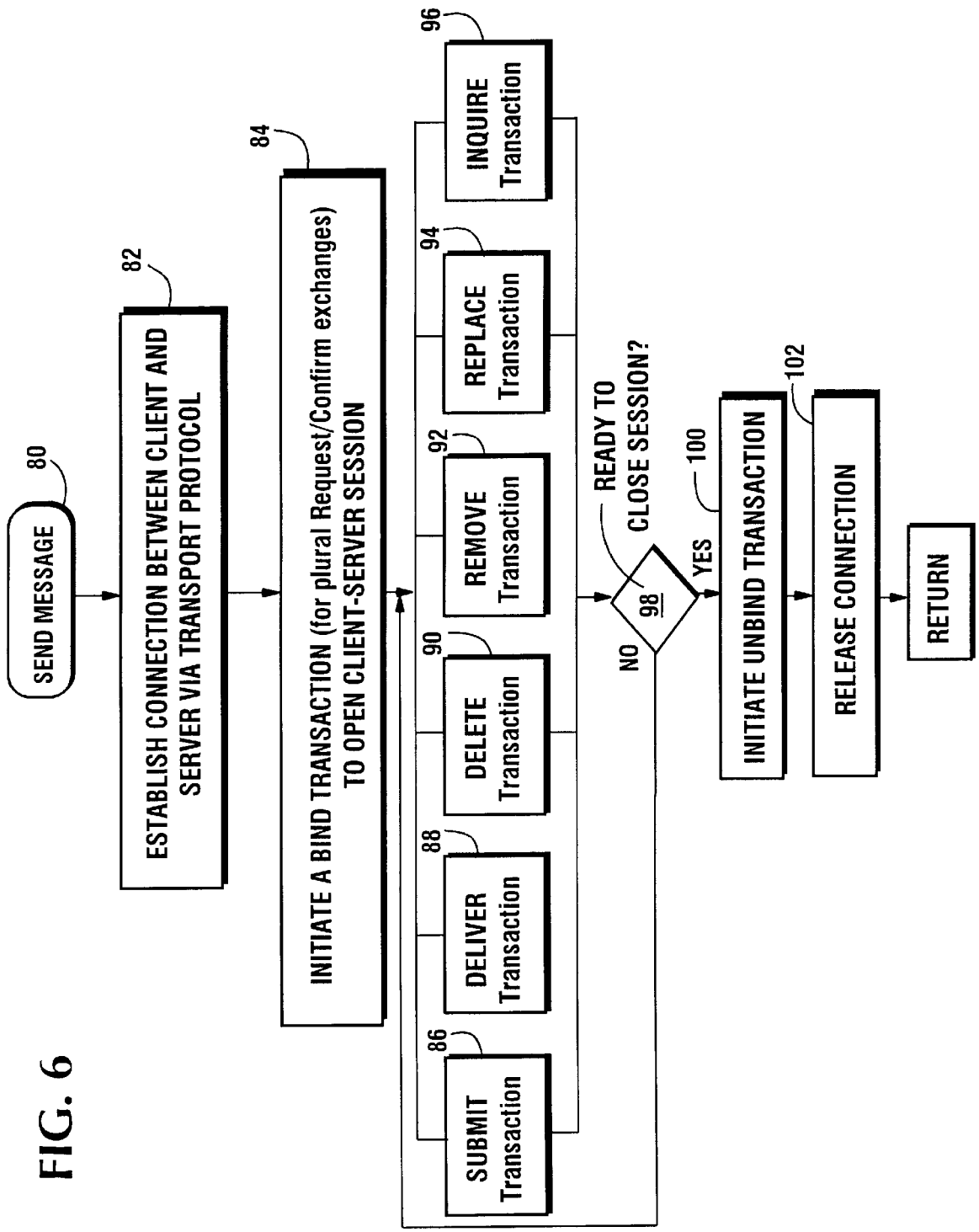
FIG. 6 is a flowchart diagram illustrating procedures for sending messages between a Message Entry Device (MED) and a Message handling Center (MC) using the CAP II protocol in accordance with the present invention.

A general example procedure for sending messages in accordance with the CAP II protocol will now be described in conjunction with the SEND message routine 80 shown in FIG. 6. Initially, a connection is established between the client and server via the Transport Protocol (TP) as described above in conjunction with FIG. 2 (block 82). The client initiates a BIND transaction to open a client-server session (block 84). Then one or more transactions are initiated including a SUBMIT transaction 86, a DELIVER transaction 88, a DELETE transaction 90, a REMOVE transaction 92, a REPLACE transaction 94, and an INQUIRE transaction 96 to perform the messaging task desired by the client. When the last transaction PDU is received and confirmed, a decision is made in block 98 whether the client is ready to close the session. If not, control returns to selection of another transaction block 80-96; otherwise, the client initiates an UNBIND transaction to close the session (block 100). When the UNBIND transaction has been confirmed, the connection is released via the transport protocol as described above in conjunction with FIG. 2 (block 102).

Because these transactional commands are few in number and easy to remember and human-readable, the CAP II protocol is easy to implement and use by human operators. Equally important is the ease with which CAP II can be expanded to add new features or adapted to new applications. Consider a hypothetical example where a new network interface is needed to allow the messaging center to send messages to coffee dispensing machines using a coffee dispensing machine message protocol. As a result, a new message service element is added to the SUBMIT transaction: COFFEETYPE{xxxx} where xxxx can equal decaf or caf. This new message service element is readily added without impacting existing client implementations because the absence of this new message service element does not adversely impact the CAP II protocol itself. Thus, by adding a new message service element to the SUBMIT transaction, e.g., COFFEETYPE{xxxx}, CAP II is easily expanded to add new features while still using the existing CAP II implementation. Since the commands are short, they save on communication costs. Specifically defining each transaction's "life" by the REQUEST-CONFIRM model removes any ambiguity in the message protocol. Marking transactions with DONE equals NO or YES provides for atomic handling of PDUs which permits variable length messages. As a result, receivers that employ the CAP II protocol do not need a large receive buffer to accommodate larger messages. Instead, the DONE parameter is used to combine several PDU transactions into a larger transaction.

In addition to these advantages, CAP II protocol employs a novel, easy to use PDU encoding methodology that greatly simplifies programming at the remote application and decoding at the receiver. Significantly, CAP II eliminates the need for an expensive ASN.1 transcoder (or other sophisticated translating) because ASN.1 is not used. To better understand the encoding methodology of the CAP II protocol, reference is now made to FIG. 7 which illustrates an example MED operator "log-in" procedure where the log-in request is made from the message entry device terminal 22 for comparison and contrast with the TME log-in set forth in the background section above. The message entry device 22 includes a display screen 40 where an initially displayed log-in screen prompts the operator for required log-in information. The first entry relates to the message handling center address which is necessary if the connection between the MED 22 and MC 10 is a switched connection. Additional information may include a password with the provision to change that password (i.e., "the new password entry") and the user ID number. After the operator inserts the required log-in information, the operator presses an ENTER key on the terminal keyboard to transfer the information to the message handling center 10. Before the log-in information is transferred to the message handling center 10, an encoder/decoder 42 converts that log-in information entered on the log-in screen into a BINDRequest PDU. A similar encoder/decoder may be used in the messaging center 10.

To help illustrate the relative simplicity and ease of human understanding associated with CAP II encoding, the "log-in" message from FIG. 7 (which is similar to the ASN.1 encoded log-in example in the background), is encoded using CAP II as follows:

BDR{TR{5}VR{1.0}WS{1}US{87654321}PW{9999}} where BDR is a "tag" that represents a BINDRequest PDU, TR is a "tag" that represents the assigned transaction number—in this example 5, VR is a "tag" that represents the version of CAP II, WS represents the window size, US is a "tag" that represents user identification, and PW is a "tag" that represents password. Significantly, the values for tags TR, VR, and WS contained within braces "{ }" are automatically generated as default values by message entry device 22 so that the user does not need to input those parameters thereby simplifying the operator's task.

An example BINDConfirm PDU is encoded in the following format:

BDC{TR{5}VR{1.0}WS{1}RC{0}} where BDC is a tag that represents a BINDConfirm PDU, TR is the transaction number, VR is the version of CAP II, WS is the window size, and RC is a tag that represents the result of the operation, i.e. whether or not it was successful.

It is easy to see the ease of encoding and relative simplicity of the CAP II log-in request and confirm encoding as compared with the ASN.1 log-in and confirm encoding example above. The braces clearly define the field values, and the tags associated with delimited field are easy to read and understand. Equally sharp in contrast is the ease with which a human operator can read and understand the information content of the log-in BINDRequest PDU and BINDConfirm PDU. The specific program code, e.g., "C" program commands, used in the encoder/decoder in the MED and the MC can be readily implemented in a number of different ways using a variety of programming languages and techniques known to those skilled in the art. Optionally, but less preferably, the encoder/decoder could be implemented using hardware.

FIG. 8 illustrates an example of sending a short message from the message entry device terminal 22 to the message handling center 10 for ultimate delivery to a destination mobile radio whose telephone number in this example is 1234567. The contents of the message in this example is a simple "call home" and is coded in ASCII code. The message "call home" is to be valid until 5 PM for delivery to the destination mobile radio. However, after 5 PM, the message is no longer valid. No notification report of the delivery is required.

Referring to the MED display screen 40, the user types in the appropriate information corresponding to the receiver address, message type, message priority, validity period, and the actual message. Note that some of the fields, such as the deferred delivery time and character set are not filled out by the operator and are automatically assigned to default values. After the information is inserted by the MED operator, the operator presses the ENTER key on the MED terminal keyboard to transfer the information to the message handling center 10. The MED encoder/decoder 42 converts the information on the screen into a CAP II SUBMITRequest PDU. As mentioned above, a similar encoder/decoder may be used in the MC.

The SUBMITRequest PDU may be encoded for example into the following:

---

SMR{TR{24}DF{1}MS{MT{0}}
 DS{RT{0}RI{PMN}NA{1234567}MP{1}ET{5.00 PM}}
 TS{TT{0}TD{CALL HOME}}}.

---

The acronyms in the SUBMITRequest PDU are defined as follows: SMR is a tag that represents a SUBMITRequest PDU, TR is a tag that represents a transaction number as defined above, DF is a tag that represents DONE (here set to 1 so that there are no following transaction), MS is a tag that represents a message information sequence, MT is a tag that represents the message type which is set to the normal default value, DS is a tag that represents a destination information sequence, RT is a tag that specifies that the destination routing is based on the RI parameter (routed to PMN), RI is a tag that specifies that the destination in this case is via the public land radio network, NA is a tag that specifies that the destination telephone number is 1234567 in PMN, MP is a tag that represents message priority, ET is a tag that represents message expiration time, TS is a tag that indicates that a text information sequence follows, TT is a tag that specifies that the character set is set to the default ASCII character set, and TD is a tag that specifies that the text message is CALL HOME. In this instance, the parameter values for the parameter fields TR, DF, MT, and RI are generated by the message entry device so that the user does not need to input those parameter values. Note the use of "nested" delimited fields and associated tags into logical groups which also facilitates human understanding of the encoded information.

The following is an example showing a return message, i.e., a SUBMITConfirm message, from a cellular phone where the MC 10 is now the client and encodes the message.

SMC{TR{24}RC{0}SS{RC{0}MR{125345624}DN{0}}

The acronyms in the SUBMITConfirm PDU are defined as follows:

SMC=SUBMITConfirm PDU

TR=Transaction number (i.e., 2.4)

RC=Result (i.e., successful)

SS=Sending sequence

RC=Result (i.e., successful)

MR=Message reference (i.e., 125345624)

DN=Relative delivery number (i.e., 0).

As is evident from these examples, the CAP II PDU encoding methodology is extremely simple compared with other complicated and expensive encoding/decoding techniques required by other protocols like TDP such as ASN.1. Text and control information are encapsulated between brace symbols functioning as field delimiters, with each encapsulated field is functionally identified by an associated tag. Thereafter, all that is needed is a relatively simple ASCII character-to-binary symbol encoding at the sending end and a binary symbol decoder-to-ASCII character decoding at the receive end. Such ASCII-binary encoding/decoding mechanisms (implemented either or both in hardware/software) are well known, easily implemented, and inexpensive. As yet another distinguishing example, compare the above CAP II SUBMITRequest PDU encoding example with the following TME SEND message ASN.1 encoding:

```
// Send Invoke ASN.1 format.-Before encoding.
SendArgument SEQUENCE [fieldcount (not encoded) = 2]
  envelope Envelope SEQUENCE [fieldcount (not encoded) = 4]
    recipients SEQUENCE OF [count = 2]
      Recipient SEQUENCE [fieldcount (not encoded) = 2]
        address Address SEQUENCE [fieldcount (not enclosed) = 2]
          domain Character String [length = 3.0]
            "TME"
          address CHOICE [index = 3]
            subscriberID SubscriberId Character String [length = 8.0]
              "tme_test"
      Recipient SEQUENCE [fieldcount (not encoded) = 1]
        address Address SEQUENCE [fieldcount (not encoded) = 2]
          domain Character String [length = 4.0]
            "TAP1"
          address CHOICE [index = 6]
            telephoneNumber TelephoneNumberType CHOICE [index = 0]
              voiceNumber TelephoneNumber Character String [length = 7.0]
                "6774325"
    messageType MessageType CHOICE [index = 0]
      simpleMessageType SimpleMessageType ENUMERATED [length (not
encoded) = 0.3]
        3
    messageSubject MessageSubject Character String [length = 0.0]
      " "
    sender Sender SEQUENCE [fieldcount (not encoded) = 2]
      senderName Character String [length = 15.0]
        "TME test client"
      senderAddress Address SEQUENCE [fieldcount (not encoded) = 2]
        domain Character String [length = 3.0]
          "TME"
        address CHOICE [index = 3]
          subscriberID SubscriberId Character String [length = 8.0]
            "tme_test"
    content CHOICE [index = 1]
      messageContent MessageContents OCTET STRING [length = 22.0]
        0x54686973206973206120e554c4c206d657373616765
// Send Invoke encoded in a ROSE envelope.
TDPTypes CHOICE [index = 0]
  invoke SEQUENCE [fieldcount (not encoded) = 3]
```

-continued

```
    invokeId InvokeId CHOICE [index = 0]
      present INTEGER [length = 1.0]
      1
    opcode Code CHOICE [index = 0]
      local INTEGER [length = 1.0]
      3
    argument OpenType [length = 87.0]
0x4c00020802544d4530e0746d655f74657374408035441503160607885436180638054d...
Total PDV length = 94.0
// Send result PDU-This is an empty ROSE envelope, indicating success.
ReceiveProc Decoding from a socket
TDPTypes CHOICE [index = 1]
returnResult SEQUENCE [fieldcount (not encoded) = 1]
    invokeId InvokeId CHOICE [index = 0]
      present INTEGER [length = 1.0]
      1
Total PDV length = 3.0
```

Thus, the contrast between ASN.1 message encoding and CAP II message encoding is dramatic. In addition to ease and simplicity of encoding and decoding, the CAP II protocol completely supports message "transparency." Message transparency means that the actual message data, e.g., "CALL HOME," can be in ASCII or binary format, and the CAP II protocol preserves that original format of the message. No conversion to a standard format, e.g., ASCII, is required. Therefore, an ASCII character message is encoded into binary symbols while a binary message is not encoded but rather simply transmitted.

The way in which CAP II accomplishes this transparency is through the use of a few, specially-handled control characters. Three characters "0" or null, "{", and "}" are treated as special, non-ASCII characters. For example, "{" and "}" are used as delimiters, signifying the beginning and end of a target field, e.g., the text message field. Null is an ASCII string terminator. CAP II encoders/decoders are programmed to recognize when a "{" or "}" or "0" is used as part of the text message in order to properly parse a received PDU. In that case, those characters are ASCII encoded/decoded, thereby further supporting complete "transparency." Because ASCII characters are encoded using 7-bits, any octet with the 8th-bit set is automatically identified and treated as binary (non-ASCII) data to provide easy, transparent programming in the remote application. To maintain the transparency of the text information (TDATA), these specific control characters are encoded when included in the TDATA (text) as follows:

| | | | |
|---|---|---|---|
| NULL | -> | "\00" | |
| '{' | -> | "\7B" | (field delineator) |
| '}' | -> | "\7D" | (field delineator) |
| 80-FF | -> | "\80-\FF" | (any octet with the 8th-bit set to 1). |

CAP II PROTOCOL DATA UNITS (PDUs)

A CAP II PDU is therefore a collection of fields separated by delimiters "{" and "}" where each delimited field is preceded by an identifying label referred to as a "TAG," e.g., "TAG{data}," as defined above. The PDU encoding employs a "constructor" concept, where a constructor encapsulates a sequence of primitive service elements or "nested" sub-sequences. A primitive service element may simply contain user data. PDU encoding using constructors is illustrated as follows:

```
TAG1{
    TAG2{
        TAG3{data}
        TAG4{data}
    }
    TAG5{data}
}
```

DU encoding may be represented more compactly for easier reading as:

TAG1{TAG2{TAG3{data}TAG4{data}}TAG5{data}}.

PDU framing is performed by the transport protocol layer.

Each of the following CAP II PDUs is described in detail in terms of (1) service "Elements" or parameters, where a service element may be mandatory or optional, and (2) a form, where the form may be either a constructor or a primitive. A primitive may be of the following type:

| Type | Composition |
|---|---|
| String | 7 bit ASCII data excluding NULL, "{", "}". |
| Number | Scalar value ranging from 0 to xxxxxxxx decimal (max 31 bits). |
| Boolean | Scalar value 0 or 1. |
| Time | YYMMDDHHmmssStt |
| | YY The least significant 2 digits of the year. |
| | MM The month ranging from 01 (Jan) to 12 (Dec). |
| | DD The day of month from 01 to 31. |
| | HH The hour of day from 00 to 23. |
| | mm The minute of hour from 00 to 59. |
| | ss The second of minute from 00 to 59. |
| | S The sign of the UTC time zone bias '+' or '−'. |
| | tt The increment of 15 minute intervals from GMT in a plus/minus sense |
| Tag | The string used to identify the field. |
| Content | The field type. Primitive elements are "String," "Number," or "Null" (no data). The allowable contents are based on the service element in question. |

PDU PARAMETER/"TAG" DEFINITIONS

Before describing the specific encoding details for the CAP II PDU transactions, the following parameter or "tag" definitions are provided for future reference.

DBC (BC)—The destination is a blind copy address. This recipient will not be able to see the other recipients of the message for messages with multiple addresses.

DCC (CC)—The destination is a carbon copy address.

DDTIM (DT)—The Deferred Delivery Time. This represents the time at which message delivery attempts will be performed. This field is optional, and if absent, immediate delivery attempts are performed subject to destination whether the message destination receiver is available (e.g., the mobile radio is turned off), traffic congestion etc.

DEXP (ET)—The Message Expiration time represented as an absolute time. This field is optional, and if absent, the MC apply the default system-wide message expiration time.

DLVNUM (DN)—The relative message delivery number. This ranges from zero to "n" where "n" is the total number of delivered messages.

DMPRI (MP)—The message priority. The priorities are:
  0—Low priority
  1—Normal Priority
  2—High Priority
  If DDTIM is not specified, the priority is set to low priority.

DNLVL (NL)—The message notification level requested by the message submitter. The notification options are represented as a bit-wise encoded scalar as follows:
  00000000 indicates no notification required
  00000001 indicates notification of delivery
  00000010 indicates notification of buffered delivery
  00000100 indicates notification of non-delivery
  00001000 indicates notification of alternate delivery.
Example: If all notifications are required, the value is:
  00001111 (hex 0F).

DONE (GF)—Permits several sub-operations within a transaction. If DONE=NO, the transaction/session is kept alive so additional operations can be performed. The transaction number, i.e., the TRAN service element value, is maintained throughout the Request/Confirm sub-transactions until transaction closure (i.e., DONE=YES). The following values are defined:
  0=NO
  1=YES DPID (PI)—The destination protocol identifier. The protocol identifier is passed transparently to the destination address. The parameter is optional, and if absent, the parameter is set to "00" as a default value.

DPSNA (NA)—The destination public switched network address. This field can be up to 24 ASCII characters and is typically ASCII numeric. The destination address may include:
  Pager ID
  MSISDN for a short messaging service entity (SMS)
  MIN or SMS
  DTE for X.25 access
  Phone Number for PSTN/PLMN dial out access
  IP address
  Internet Email address DRTE (RI)—The DRTE in MC represents the destination routing directory key. The field identifies the destination SME. The field is an ASCII string of up to 24 characters. The content of this field is dictated by a Routing Directory data base in the MC.

DRTYP (RT)—The destination route type. This field is encoded as an numeric string in the following form: "[AAA] B", where AAA is defined as 3 ASCII Numeric characters that are converted to a scalar value. The field is optional. For example:
  "208" is converted to decimal 208 (hex 0xD0).
  "255" is the maximum allowed value (hex decimal 0xFF).
B is defined as a single ASCII Numeric character that is converted to the following scalar values:
  0=Route based on DRTE. The DPSNA is not validated.
  1=Route based on DPSNA. The destination SME is derived by using the DPSNA as a subscriber key with the subscriber information identifying the destination SME.
  2=Route based on DRTE but validate the DPSNA against the subscriber database.
  3=Route based on Number Plan definition. In this case the DPSNA is compared against a number plan table to determine the SME the message is to be routed to.

DSEQ (DS)—The destination information sequence. This field is a constructor and as such contains no data.

DSTAT (MS)—The message delivery status. This feature is valid when messages are submitted with Notification (DNLVL) enabled with the NTF route pointing to a retention queue at the MC. The message stays on that retention queue until the Notification message expires as defined by NEXP when the message was originally submitted. Message delivery status values include:
  0=Message delivered
  1=Buffered Notification
  2=Message Rejected
  3=Message Validity Period Expired.
  4=Pending Delivery
  5=Connection failed
  6=Establishment failed
  7=Sending failed
  8=Termination failed
  9=Disconnection failed
  10=Invalid login
  11=System failed
  12=Busy destination
  13=Device failed
  14=No party
  15=No service
  16=No channel
  17=Absent subscriber
  18=Subscriber not available
  19=Facility not supported
  20=Reserved
  21=Reserved
  22=Reserved
  23=Reserved DTIME (ST)—The Message submission time represented as an absolute time.

The field is optional, and if absent, the MC applies the default current system time.

DUREF (UR)—The user message reference allows message Replace/Delete operations using a user-supplied message reference. This field is a string of up to 16 ASCII characters with no NULL's. If the submitter enters this field, it may be used for future message inquiry operations to determine message delivery status. The parameter is optional.

MREF (MR)—The message reference. The field is a string of up to 16 ASCII numeric characters with no NULL's.

MRMETH (RM)—The message reference look up method. This element is a scalar consisting of the following options:
  0=indicates look up by message reference
  1=indicates look up by user reference
  2=indicates look up distribution list in routing database (for distribution list deletion function)

MSEQ (MS)—The message information sequence is a constructor and contains no data.

MTIME (ST)—The Message submission time represented as an absolute time. This field is optional. If absent, the MC will apply the default current system time.
MTYPE (MT)—The message type of a message being delivered. The message types are:
  0=Normal message
  1=Delivery Notification
  2=Alternate Delivery
  3=Delivery Reject
  4=Distribution List
NEWPSWD (NP)—The user's new password. At a BIND transaction, the user can change the password.
NEXP (NE)—The Notification Message Expiration time represented as an absolute time. This field is optional. If absent, the MC will apply the default system-wide message expiration time.
NOCNF (NC)—Permits the requester to indicate to receiver whether the confirmation PDU is to be suppressed. This applies to those Requests/Confirms involved in multi-operations within a transaction. Performance is improved when submitting or delivering long messages or submitting messages with many destinations. For example, for message delivery, the delivery requester may tell the Server to "batch" all confirmations until the transaction is completed in which case the final confirm PDU is issued. If the DONE=YES, the NOCNF option is ignored. If the optional NOCNF is missing, it is assumed that normal confirmation processing is requested. Allowed values:
  0=NO
  1=YES
NPSNA (NA)—The notification public switched network address. This field can be up to 24 ASCII characters and is typically ASCII numeric. The significance of this field is dependant on the destination SME.
NRTE (RI)—In the MC, this represents a routing directory key. This in effect identifies the notification SME. The content of this field is dictated by the MC's Routing Directory database. This field is an ASCII string of up to 24 characters.
NRTYP (RT)—The notification route type. This field is encoded as an numeric string in the following form: "[AAA] B" as defined above. See DRTYP(RT) for information about the encoding of NRTYP.
NSEQ (NS)—The notification information sequence. This field is a constructor and as such contains no data. This sequence contains information required when the recipient of the message needs to perform Delivery notification functions back to specified notification address. If these functions are not required, the entire NSEQ sequence may be omitted.
NUMDEL (ND)—The number of messages deleted as a result of a delete request.
OPSNA (NA)—The originating public switched network address. This field can be up to 24 ASCII characters and is typically ASCII numeric. See DPSNA (NA) for information regarding encoding.
ORTE (RI)—The ORTE represents the originating routing directory key. The ORTE identifies the originating SME. The field is an ASCII string of up to 24 characters. The content of this field is dictated by the MC Routing Directory data base.
ORTYP (RT)—The originator route type. This field is encoded as an numeric string in the following form: "[AAA] B" as defined above. See DRTYP (RT) for information regarding encoding.
OSEQ (OS)—The originator information sequence. The field is a constructor and as such contains no data. This sequence contains information required when the recipient of the message needs to perform Reply and/or notification functions back to the message originator. If these functions are not required, the entire OSEQ sequence may be omitted.
PASSWORD (PW)—The user's password. This field may be 2-way encrypted based on mutual agreement between User and the network operator. The MC can be configured to restrict and age the password. If at bind time the password has expired, an appropriate result code will be returned. The CAP II II will maintain the transport connection so that the user can Re-Bind with a new password (NEWPSWD). The length of the PASSWORD is up to 16 characters.
PDU—Identifies the PDU type. As a constructor, no data component is associated with this service element. The following PDUs are defined:

| | | |
|---|---|---|
| 0 = BDR | (BindRequest) |
| 1 = BDC | (BindConfirm) |
| 2 = UBR | (UnbindRequest) |
| 3 = UBC | (UnbindConfirm) |
| 4 = SMR | (SubmitRequest) |
| 5 = SMC | (SubmitConfirm) |
| 10 = DLR | (DeleteRequest) |
| 11 = DLC | (DeleteConfirm) |
| 12 = DMR | (DeliverRequest) |
| 13 = DMC | (DeliverConfirm) |
| 16 = IMR | (InquireRequest) |
| 17 = IMC | (InquireConfirm) |
| 20 = RMR | (ReplaceRequest) |
| 21 = RMC | (ReplaceConfirm) |
| 22 = MMR | (RemoveRequest) |
| 23 = MMC | (RemoveConfirm) |

All other values are reserved.
RESULT (RC)—The result of the operation. This field is represented in all Confirmation PDU's:
  0=Successful operation.
  1=PDU decode error
  2=Invalid service element.
  3=Missing service element.
  4=System Overload, request rejected.
  5=System Error, request rejected.
  6=Transaction value already in use.
  7=Request time out.
  8=Too many destinations.
  9=Invalid destination.
  10=Restricted destination.
  11=No destinations specified.
  12=Invalid originator address.
  13=Invalid notification address.
  14=No text component supplied.
  15=Overlong message.
  16=Message not found.
  17=Access denied.
  18=Last message.
SSEQ (SS)—The sending information sequence. This field is a constructor and as such contains no data.
SUBJ (SJ)—Optional Subject field. Maximum of 80 ASCII characters.
TDATA (TD)—The actual text data represented as a counted stream of 8-bit octets. The length may be limited, e.g., 2048 octets/characters. The length used must be serviceable by the recipient SME. For example in GSM networks, 160 characters are supported without message segmentation.
TRAN (TR)—Transaction reference assigned by request originator. The TRAN is used to resolve transaction by matching pending request with received Confirm. Value ranges is between 1 to 1023.

TSEQ (TS)—The text sequence. This field is a constructor and as such contains no data.

TTYP (TT)—The character set selection. The scalar values allowed are destination SME dependent but is in the range from 0 to 255 decimal. The parameter is bitwise coded as shown in the following example of commonly used coding:

| | |
|---|---|
| 0 | (0 x 00) = default alphabet |
| 224 | (0 x E0) = MWI indicator OFF |
| 225 | (0 x E1) = MWI indicator ON |
| 241 | (0 x F1) = 7 bit ME |
| 242 | (0 x F2) = 7 bit SIM |
| 245 | (0 x F5) = 8 bit ME |
| 246 | (0 x F6) = 8 bit SIM |

USER (US)—The user name. This element is used at bind time to provide user validation against the MC's database.
VERSION (VR)—Protocol version number.
WINDOW (WS)—Maximum transaction window. This represents the maximum number of Requests outstanding pending a Confirm. For half-duplex transports the window size is set to 1. The window is represented as a scalar ranging from 1 to 255. A window of 1 indicates an ARQ type procedure where only one request can be outstanding at a time. In this case the TRAN field in the PDU's is meaningless as Request/Confirm matching is not required. The Bind requester, requests the window size and the responder can negotiate the window to a value less than or equal to what requester stipulates.

GENERATING THE CAP II PDUs

A detailed description along with a supporting example of how each CAP II PDU may be generated is now provided.

BindRequest—The BindRequest PDU (BDR) sent from the Client to the Server is encoded as follows:

| Element | Required | Form | Tag | Content |
|---|---|---|---|---|
| PDU | Yes | Constructor | 0 - BDR | Sequence |
| TRAN | Yes | Primitive | 0 - TR | Number |
| VERSION | Yes | Primitive | 1 - VR | Number |
| WINDOW | Yes | Primitive | 2 - WS | Number |
| USER | Yes | Primitive | 3 - US | String |
| PASSWORD | Yes | Primitive | 4 - PW | String |
| NEWPSWD | No | Primitive | 5 - NP | String |
| NOCNF | No | Primitive | 6 - NC | Integer |

Example:
BDR{TR{1}VR{1.0}WS{1}US{12345678}PW{9999}NP{1212}NC{YES}}

Bind Confirm—The Bind Confirm PDU (BDC) is issued in response to the BindRequest sent from the Server to the Client is as follows:

| Element | Required | Form | Tag | Content |
|---|---|---|---|---|
| PDU | Yes | Constructor | 0 - BDC | Sequence |
| TRAN | Yes | Primitive | 0 - TR | Number |
| VERSION | Yes | Primitive | 1 - VR | Number |
| WINDOW | Yes | Primitive | 2 - WS | Number |
| RESULT | Yes | Primitive | 3 - RC | Number |

Example: BDC{TR{1}VR{1.0}WS{1}RC{0}}

UnbindRequest—The UnbindRequest PDU (UBR) is sent from the Client to the Server to terminate a session.

| Element | Required | Form | Tag | Content |
|---|---|---|---|---|
| PDU | Yes | Constructor | 2 - UBR | Sequence |
| TRAN | Yes | Primitive | 0 - TR | Number |
| USER | No | Primitive | 1 - US | String |

Example: UBR{TR{2}US{87654321}}

Unbind Confirm—The Unbind Confirm PDU (UBC) is sent from the Server to the Client in response to the UnbindRequest.

| Element | Required | Form | Tag | Content |
|---|---|---|---|---|
| PDU | Yes | Constructor | 3 - UBC | Sequence |
| TRAN | Yes | Primitive | 0 - TR | Number |
| RESULT | Yes | Primitive | 1 - RC | Number |

Example: UBC{TR{2}RC{0}}

SubmitRequest—The SubmitRequest PDU (SMR) is sent from the Client to the Server. The DSEQ and TSEQ sequences are optional; however, they are provided in separate transactions prior to the transaction commitment. The Submit transaction may also be used to add distribution lists. In this case, the MTYPE is set to indicate that the message submitted includes a list of destinations to be applied to a distribution list record in the routing database in MC. The distribution list name is loaded in the MREF parameter. When adding distribution lists, the following fields are not required: NSEQ, DSEQ and TSEQ. The USER name from the BindRequest is combined with the Distribution list key to prevent inadvertent name collisions in the MC routing data base.

| Element | Required | Form | Tag | Content |
|---|---|---|---|---|
| PDU | Yes | Constructor | 4 - SMR | Sequence |
| TRAN | Yes | Primitive | 0 - TR | Number |
| DONE | Yes | Primitive | 1 - DF | Boolean |
| MSEQ | Yes | Constructor | 16 - MS | Sequence |
| SUBJ | No | Primitive | 0 - SJ | String |
| MREF | No | Primitive | 1 - MR | String (Note 1) |
| MTYPE | Yes | Primitive | 2 - MT | Number |
| MTIME | No | Primitive | 3 - ST | Time String |
| OSEQ | No | Constructor | 17 - OS | Sequence |
| ORTYP | No | Primitive | 0 - RT | Number |
| ORTE | No | Primitive | 1 - RI | String |
| OPSNA | No | Primitive | 2 - NA | String |
| NSEQ | No | Constructor | 18 - NS | Sequence |
| NRTYP | No | Primitive | 0 - RT | Number |
| NRTE | No | Primitive | 1 - RI | String |
| NPSNA | No | Primitive | 2 - NA | String |
| NEXP | No | Primitive | 3 - NE | Time String |
| DSEQ | No | Constructor | 19 - DS | Repeating Sequence |
| DRTYP | Yes | Primitive | 0 - RT | Number |
| DRTE | Yes | Primitive | 1 - RI | String |
| DPSNA | Yes | Primitive | 2 - NA | String |
| DMPRI | Yes | Primitive | 3 - MP | Number |
| DEXP | No | Primitive | 4 - ET | Time String |
| DDTIM | No | Primitive | 5 - DT | Time String |
| DNLVL | No | Primitive | 6 - NL | Number |
| DUREF | No | Primitive | 7 - UR | String |
| DCC | No | Primitive | 8 - CC | Boolean |
| DBC | No | Primitive | 9 - BC | Boolean |
| DPID | No | Primitive | 10 - PI | Scalar |
| DSTAT | No | Primitive | 11 - MS | Scalar |
| DTIME | No | Primitive | 12 - ST | Time String |
| TSEQ | No | Constructor | 20 - TS | Sequence |
| TTYP | Yes | Primitive | 0 - TT | Number |

| Element | Required | Form | Tag | Content |
|---|---|---|---|---|
| TDATA | Yes | Primitive | 1 - TD | Octet String |

Because the Message Reference only applies to Replace and Remove transaction, it has no significance in this PDU.

```
Example: SMR{
    TR{3}
    DF{1}
    MS{
        MT{0}
    }
    OS{            (from VML system)
        RT{0}
        RI{VML}
        NA{123456}
    }
    DS{
        RT{0}      (destination is PLMN-SMS)
        RI{PMN}
        NA{5163564841}
        MP{0}
    }
    DS{
        RT{0}      (destination is a pager)
        RI{TAP}
        NA{876543}
        MP{0}
    }
    TS{
        TT{0}
        TD{You have 3 new messages ... }
    }
}
```

SubmitConfirm—The Submit Confirm PDU (SMC) is sent in response to the SubmitRequest from the Server to the Client.

| Element | Required | Form | Tag | Content |
|---|---|---|---|---|
| PDU | Yes | Constructor | 5 - SMC | Sequence |
| TRAN | Yes | Primitive | 0 - TR | Number |
| RESULT | Yes | Primitive | 1 - RC | Number |
| SSEQ | No | Constructor | 21 - SS | Repeating Sequence |
| RESULT | Yes | Primitive | 0 - RC | Number |
| MREF | Yes | Primitive | 1 - MR | String |
| DLVNUM | Yes | Primitive | 2 - DN | Number |

Note: If the DONE flag was not set in the SubmitRequest, the SSEQ sequence will not be present.

```
Example: SMC{
    TR{3}
    RC{0}
    SS{          (successful)
        RC{0}
        MR{1092837465}
        DN{0}
    }
    SS{          (failed, invalid destination)
        RC{9}
        MR{0}
        DN{1}
    }
}
```

DeleteRequest—The DeleteRequest PDU (DLR) is sent from the Client to the Server to delete a previously submitted message.

| Element | Required | Form | Tag | Content |
|---|---|---|---|---|
| PDU | Yes | Constructor | 10 - DLR | Sequence |
| TRAN | Yes | Primitive | 0 - TR | Number |
| MRMETH | Yes | Primitive | 1 - RM | Number |
| MREF | Yes | Primitive | 2 - MR | String |

Example: DLR{TR{5}RM{0}MR{123456789}}

DeleteConfirm—The Delete Confirm PDU(DLC) is sent from the Server to the Client in response to the DeleteRequest.

| Element | Required | Form | Tag | Content |
|---|---|---|---|---|
| PDU | Yes | Constructor | 11 - DLC | Sequence |
| TRAN | Yes | Primitive | 0 - TR | Number |
| RESULT | Yes | Primitive | 1 - RC | Number |
| NUMDEL | Yes | Primitive | 2 - ND | Number |

Example: DLC{TR{5}RC{16}ND{0}}

DeliverRequest—The DeliverRequest PDU (DMR) is sent from the Client to the Server to request Delivery of a message from the Server.

| Element | Required | Form | Tag | Content |
|---|---|---|---|---|
| PDU | Yes | Constructor | 12 - DMR | Sequence |
| TRAN | Yes | Primitive | 0 - TR | Number |
| MTYPE | Yes | Primitive | 1 - MT | Number |

Example: DMR{TR{6}MT{0}}

DeliverConfirm—The DeliverConfirm PDU (DMC) is sent from the Server to the Client in response to the DeliverRequest. The DeliverConfirm PDU contains a message (if found); otherwise, a No-Message-Found status is returned.

| Element | Required | Form | Tag | Content |
|---|---|---|---|---|
| PDU | Yes | Constructor | 13 - DMC | Sequence |
| TRAN | Yes | Primitive | 0 - TR | Number |
| DONE | Yes | Primitive | 1 - DF | Boolean |
| RESULT | Yes | Primitive | 2 - RC | Number |
| MSEQ | Yes | Constructor | 16 - MS | Sequence |
| SUBJ | No | Primitive | 0 - SJ | String |
| MREF | No | Primitive | 1 - MR | String |
| MTYPE | Yes | Primitive | 2 - MT | Number |
| MTIME | No | Primitive | 3 - ST | Time String |
| OSEQ | No | Constructor | 17 - OS | Sequence |
| ORTYP | No | Primitive | 0 - RT | Number |
| ORTE | No | Primitive | 1 - RI | String |
| OPSNA | No | Primitive | 2 - NA | String |
| NSEQ | No | Constructor | 18 - NS | Sequence |
| NRTYP | No | Primitive | 0 - RT | Number |
| NRTE | No | Primitive | 1 - RI | String |
| NPSNA | No | Primitive | 2 - NA | String |
| NEXP | No | Primitive | 3 - NE | Time String |
| DSEQ | No | Constructor | 19 - DS | Repeating Sequence |
| DRTYP | Yes | Primitive | 0 - RT | Number |
| DRTE | Yes | Primitive | 1 - RI | String |
| DPSNA | Yes | Primitive | 2 - NA | String |
| DMPRI | Yes | Primitive | 3 - MP | Number |
| DEXP | No | Primitive | 4 - ET | Time String |
| DDTIM | No | Primitive | 5 - DT | Time String |
| DNLVL | No | Primitive | 6 - NL | Number |
| DUREF | No | Primitive | 7 - UR | String |
| DCC | No | Primitive | 8 - CC | Boolean |
| DBC | No | Primitive | 9 - BC | Boolean |
| DPID | No | Primitive | 10 - PI | Scalar |
| DSTAT | No | Primitive | 11 - MS | Scalar |

| Element | Required | Form | Tag | Content |
|---|---|---|---|---|
| DTIME | No | Primitive | 12 - ST | Time String |
| TSEQ | No | Constructor | 20 - TS | Sequence |
| TTYP | Yes | Primitive | 0 - TT | Number |
| TDATA | Yes | Primitive | 1 - TD | Octet String |

If a message is not found, i.e., RESULT=MESSAGE NOT FOUND, the following elements will not be present: MSEQ, DSEQ, OSEQ, NSEQ and TSEQ.

```
Example: DMC{
    TR{6}
    DF{1}
    RC{0}
    MS{
        MT{0}
    }
    OS{         (from Internet EMail)
        RT{0}
        RI{IML}
        NA{joe@foo.com}
    }
    DS{
        RT{0}       (destination is
                     PLMN-SMS)
        RI{PMN}
        NA{5163564841}
        MP{1}
    }
    TS{
        TT{0}
        TD{You have 3 new
          messages . . . }
    }
}
```

InquireRequest—The InquireRequest PDU (IMR) is sent from the Client to the Server to request the status of a previously submitted message. InquireRequests are typically initiated by the short messaging entity. The InquireRequest PDU uses the MREF parameter to identify the message.

| Element | Required | Form | Tag | Content |
|---|---|---|---|---|
| PDU | Yes | Constructor | 16 - IMR | Sequence |
| TRAN | Yes | Primitive | 0 - TR | Scalar |
| MRMETH | Yes | Primitive | 1 - RM | Scalar |
| MREF | Yes | Primitive | 2 - MR | String |

```
Example: IMR{
    TR{4321}
    RM{1}
    MR{12345678}
}
```

InquireConfirm—The InquireConfirm PDU (IMC) is sent from the Server to the Client in response to the InquireRequest. This PDU contains the status of a previous submitted message.

| Element | Required | Form | Tag | Content |
|---|---|---|---|---|
| PDU | Yes | Constructor | 17 - IMC | Sequence |
| TRAN | Yes | Primitive | 0 - TR | Scalar |
| RESULT | Yes | Primitive | 1 - RC | Scalar |
| DSEQ | No | Constructor | 19 - DS | Repeating Sequence |
| DRTYP | Yes | Primitive | 0 - RT | Number |
| DRTE | Yes | Primitive | 1 - RI | String |
| DPSNA | Yes | Primitive | 2 - NA | String |
| DMPRI | Yes | Primitive | 3 - MP | Number |
| DEXP | No | Primitive | 4 - ET | Time String |
| DDTIM | No | Primitive | 5 - DT | Time String |
| DNLVL | No | Primitive | 6 - NL | Number |
| DUREF | No | Primitive | 7 - UR | String |
| DCC | No | Primitive | 8 - CC | Boolean |
| DBC | No | Primitive | 9 - BC | Boolean |
| DPID | No | Primitive | 10 - PI | Scalar |
| DSTAT | Yes | Primitive | 11 - MS | Scalar |
| DTIME | No | Primitive | 12 - ST | Time String |

```
Example: IMC{
    TR{4321}
    RC{1}
    DS{
        RT{0}       (destination is
                     PLMN-SMS)
        RI{PMN}
        NA{5163564841}
        MP{1}
        MS{1} (message delivered)
        ST{9601101145030-10}
    }
    DS{
        RT{0} (destination is a
                pager)
        RI{TAP}
        NA{876543}
        MP{1}
        MS{0} (message not
                delivered)
        ST{0}
    }
}
```

Replace Request—The Replace Request PDU (RMR) is similar to the SubmitRequest. The MREF service element indicates the message reference of the originally submitted message that the Client wished to replace. If originally submitted message cannot be found, the ReplaceRequest is treated as SubmitRequest. Another method of replacement is to specify a MREF of zero. In this case, the OPSNA field in the OSEQ Sequence is used as the replace selection criteria. This method is typically used for Voice Mail, Fax Mail and Interactive Voice Response (IVR) type submissions and obviates the need for the sending application to "remember" the message references. If several messages were submitted with a given OPSNA, and a Replace PDU is issued with the same OPSNA, all pending deliveries that match the OPSNA will be deleted and replaced with the new message. In addition, the message deletion function may be performed using the Replace PDU by specifying no TSEQ (Text sequence). The Replace request therefore becomes a Replace-With-Nothing which is in effect a delete function. Of course, the Remove transaction (see below) is more appropriate for this type of operation.

| Element | Required | Form | Tag | Content |
|---|---|---|---|---|
| PDU | Yes | Constructor | 20 - RMR | Sequence |
| TRAN | Yes | Primitive | 0 - TR | Number |
| DONE | Yes | Primitive | 1 - DF | Boolean |
| MSEQ | Yes | Constructor | 16 - MS | Sequence |
| SUBJ | No | Primitive | 0 - SJ | String |
| MREF | No | Primitive | 1 - MR | String |
| MTYPE | Yes | Primitive | 2 - MT | Number |
| MTIME | No | Primitive | 3 - ST | Time String |
| OSEQ | No | Constructor | 17 - OS | Sequence |

| Element | Required | Form | Tag | Content |
|---|---|---|---|---|
| ORTYP | No | Primitive | 0 - RT | Number |
| ORTE | No | Primitive | 1 - RI | String |
| OPSNA | No | Primitive | 2 - NA | String |
| NSEQ | No | Constructor | 18 - NS | Sequence |
| NRTYP | No | Primitive | 0 - RT | Number |
| NRTE | No | Primitive | 1 - RI | String |
| NPSNA | No | Primitive | 2 - NA | String |
| NEXP | No | Primitive | 3 - NE | Time String |
| DSEQ | No | Constructor | 19 - DS | Repeating Sequence |
| DRTYP | Yes | Primitive | 0 - RT | Number |
| DRTE | Yes | Primitive | 1 - RI | String |
| DPSNA | Yes | Primitive | 2 - NA | String |
| DMPRI | Yes | Primitive | 3 - MP | Number |
| DEXP | No | Primitive | 4 - ET | Time String |
| DDTIM | No | Primitive | 5 - DT | Time String |
| DNLVL | No | Primitive | 6 - NL | Number |
| DUREF | No | Primitive | 7 - UR | String |
| DCC | No | Primitive | 8 - CC | Boolean |
| DBC | No | Primitive | 9 - BC | Boolean |
| DPID | No | Primitive | 10 - PI | Scalar |
| DSTAT | No | Primitive | 11 - MS | Scalar |
| DTIME | No | Primitive | 12 - ST | Time String |
| TSEQ | No | Constructor | 20 - TS | Sequence |
| TTYP | Yes | Primitive | 0 - TT | Number |
| TDATA | Yes | Primitive | 1 - TD | Octet String |

```
Example: RMR{
    TR{3}
    DF{1}
    MS{
        MT{0}
    }
    OS{          (from VML system)
        RT{0}
        RI{VML}
        NA{123456}
    }
    DS{
        RT{0}     (destination is
                   PLMN-SMS)
        RI{PMN}
        NA{5163564841}
        MP{1}
    }
    DS{
        RT{0}     (destination is a
                   pager)
        RI{TAP}
        NA{876543}
        MP{0}
    }
    TS{
        TT{0}
        TD{new messages . . . }
    }
}
```

ReplaceConfirm—The ReplaceConfirm PDU (RMC) is similar to the SubmitConfirm PDU.

| Element | Required | Form | Tag | Content |
|---|---|---|---|---|
| PDU | Yes | Constructor | 21 - RMC | Sequence |
| TRAN | Yes | Primitive | 0 - TR | Number |
| RESULT | Yes | Primitive | 1 - RC | Number |
| SSEQ | No | Constructor | 21 - SS | Repeating Sequence |
| RESULT | Yes | Primitive | 0 - RC | Number |
| MREF | Yes | Primitive | 1 - MR | String |
| DLVNUM | Yes | Primitive | 2 - DN | Number |

```
Example: RMC{
    TR{3}
    RC{0}
```

```
    SS{          (success)
        RC{0}
        MR{1092837465}
        DN{0}
    }
    SS{          (failed, invalid
                  destination)
        RC{9}
        MR{0}
        DN{1}
    }
}
```

Remove Request—The Remove Request PDU (MMR) is similar to the Submit/Replace Requests except there are no TSEQ and NSEQ sequences. The MREF service element indicates the message reference of the originally submitted message that the client wishes to remove/delete. Another method of removal/deletion is to specify a MREF of zero. In this case, the OPSNA field in the OSEQ sequence is used as the remove selection criteria. This method is typically used for Voice Mail, Fax Mail and IVR type submissions and obviates the need for the sending application to "remember" the message references. If several messages were submitted with a given OPSNA and a Remove is issued with the same OPSNA, all pending deliveries that match the OPSNA will be removed/deleted.

| Element | Required | Form | Tag | Content |
|---|---|---|---|---|
| PDU | Yes | Constructor | 22 - MMR | Sequence |
| TRAN | Yes | Primitive | 0 - TR | Number |
| DONE | Yes | Primitive | 1 - DF | Boolean |
| MSEQ | Yes | Constructor | 16 - MS | Sequence |
| SUBJ | No | Primitive | 0 - SJ | String |
| MREF | No | Primitive | 1 - MR | String |
| MTYPE | Yes | Primitive | 2 - MT | Number |
| MTIME | No | Primitive | 3 - ST | Time String |
| OSBQ | No | Constructor | 17 - OS | Sequence |
| ORTYP | No | Primitive | 0 - RT | Number |
| ORTE | No | Primitive | 1 - RI | String |
| OPSNA | No | Primitive | 2 - NA | String |
| DSEQ | No | Constructor | 19 - DS | Repeating Sequence |
| DRTYP | Yes | Primitive | 0 - RT | Number |
| DRTE | Yes | Primitive | 1 - RI | String |
| DPSNA | Yes | Primitive | 2 - NA | String |
| DMPRI | Yes | Primitive | 3 - MP | Number |
| DEXP | No | Primitive | 4 - ET | Time String |
| DDTIM | No | Primitive | 5 - DT | Time String |
| DNLVL | No | Primitive | 6 - NL | Number |
| DUREF | No | Primitive | 7 - UR | String |
| DCC | No | Primitive | 8 - CC | Boolean |
| DBC | No | Primitive | 9 - BC | Boolean |
| DPID | No | Primitive | 10 - PI | Scalar |
| DSTAT | No | Primitive | 11 - MS | Scalar |
| DTIME | No | Primitive | 12 - ST | Time String |

```
Example: MMR{
    TR{3}
    DF{1}
    MS{
        MT{0}
    }
    OS{          (from VML system)
        RT{0}
        RI{VML}
        NA{123456}
    }
    DS{
        RT{0}     (destination is
                   PLMN-SMS)
```

-continued

| Element | Required | Form | Tag | Content |
|---|---|---|---|---|
| RI{PMN} | | | | |
| NA{5163564841} | | | | |
| MP{1} | | | | |
| } | | | | |
| } | | | | |

RemoveConfirm—The RemoveConfirm PDU (MMC) is similar to the Replace/Submit Confirm. The returned message reference is can be ignored.

| Element | Required | Form | Tag | Content |
|---|---|---|---|---|
| PDU | Yes | Constructor | 23 - MMC | Sequence |
| TRAN | Yes | Primitive | 0 - TR | Number |
| RESULT | Yes | Primitive | 1 - RC | Number |
| SSEQ | No | Constructor | 21 - SS | Repeating Sequence |
| RESULT | Yes | Primitive | 0 - RC | Number |
| MREF | Yes | Primitive | 1 - MR | String |
| DLVNUM | Yes | Primitive | 2 - DN | Number |

Example:
RMC{TR{3}RC{0}SS{RC{0}MR{1092837465}DN{0}}

The following is an example of the CAP II protocol's "expandability" that also demonstrates its ease of programming to permit ready addition of new, future services Assume a current CAP II version of the "BindRequest" transaction in the form:

BDR{TR{1}VR{1.0}WS{1}US{Smith}PW{John}NP{ }NCP{1}}.

If a new field is to be added to the BIND transaction, i.e., "BillingId," a new argument is added to the encoder software for such a billing ID. The new BindRequest PDU would then look like:

BDR{TR{1}VR{1.0}WS{1}US{Smith}PW{John}NP{ }NCPT {1}BI{12345678}}}

The addition of this new billing ID service element/feature does not affect the previous implementations of CAP II. The Billing ID field would be defined as "optional," and all optional fields may by definition be absent which insures backward capability.

There are many different environments where the CAP II protocol could be used. FIGS. 9–15 show other embodiments of the present invention where the CAP II protocol may be applied.

FIG. 9 shows a very general embodiment where the CAP II protocol is used in a generic communications system to facilitate a message communication between the computer 120 and the message handling center 100. The message handling center interfaces with any other type of communications network 140 to which communications terminal 160 is connected. FIG. 10 shows a more specific example where the CAP II protocol is used in the communications between paging, voice mail, or facsimile mail systems 180 and a message handling center 100. Other communications networks and communications terminals to which the message handling center 100 is connected are not shown.

FIG. 11 shows an alternative architecture where plural message handling centers 100 and 240 communicate with messaging network 200 using the CAP II protocol. In addition, paging system 220 communicates with the messaging network 200 using CAP II.

FIG. 12 shows an example embodiment of the CAP II protocol applied to communications from a personal computer 260 to the telephone network 280 (e.g., the PSTN), which communicates using the CAP II protocol with the messaging center 100. Because the communications network 280 uses analog-based telephone lines, personal computer 260 uses a standard modem 262 to convert between analog and digital formats.

FIG. 13 shows an alternative example embodiment of the present invention where the personal computer 260 connects without the benefit of a modem directly to the packet data network 300 and communicates using CAP II.

FIG. 14 shows an example embodiment of the CAP II protocol as applied to communications between a live operator for message dispatch 340. A call subscriber telephones in via the telephone network 280 to the live operator for message dispatch 340. The live operator enters the caller's message via the message entry device (MED) 360 which is then communicated using CAP II to the Internet 320 for delivery to the message center 100 also using CAP II. Personal computer 260 is shown connected to the Internet 320 and communicates using the CAP II protocol as well.

FIG. 15 shows an example embodiment the CAP II protocol to communications between an intelligent network and interactive voice response unit with a message handling center. Intelligent network 380 includes a service control point (SCP) 400 connected to a service switching point (SSP) 420. Both the service control point 400 and service switching point 420 are connected to intelligent peripheral (IP) 440 and communicate with message center 100. Interactive voice response unit 460 includes a computer 480 and database 500 connected to a voice response unit 520 used to respond to telephone callers by way of the public switch telephone network 280.

Therefore, although the invention was described in detail in the context of an application to a short messaging service for cellular telephones, the present invention may be implemented in any type of messaging application as demonstrated for example in the alternative embodiments. Although not described in detail, a portable applications programming interface (API) may be employed to assist a human operator in developing a CAP II client. In fact, the operator using such a client developer need not even know what the CAP II transaction PDUs look like. Moreover, those skilled in the art will recognize that CAP II may be used in any type of electronic communications between two devices. In that regard and for example, a message entry device is to be broadly understood as any device that permits an operator to enter and convey a message. Consequently, while the invention has been described in connection with what is believed to be practical preferred embodiments, it is to be understood that the invention is not to be limited to the disclosed embodiments or to the specification, but on the contrary, is intended to cover various modifications and equivalent arrangements included within the spirit and scope of the independent claims.

What is claimed is:

1. A method for exchanging data between a message entry device (MED) and a message handling center (MC), comprising:

defining one of the MED and MC which initiates a communications connection between the MED and MC as a client with the other of the MED and MC being a server, where either the MED or the MC may independently initiate a communications connection as the client;

establishing a set of human-readable transactional commands used by the client and server to transmit information over the established communications connection, each transactional command including a transaction request protocol data unit (PDU) sent from the client which initiates the transaction and a transaction confirm protocol data unit (PDU) sent from the server which confirms whether the transaction request is successful;

generating at one of the MED and the MEC a message to be sent to the other of the MED and the MC;

encapsulating the message between first and second delimiters and associating a message tag with the encapsulated message;

encapsulating the delimited message and associated message tag between third and fourth delimiters to form a protocol data unit (PDU) and associating a PDU tag with the encapsulated message, thereby generating an encoded PDU; and sending the encoded PDU to the other of the MED and the MC.

2. The method in claim 1, wherein the set of transactions includes a bind transaction used by the client to initiate a communications session between the client and server to permit plural transaction request PDUs and transaction confirm PDUs to be exchanged during the communications session.

3. The method in claim 2, wherein the set of transactions includes an unbind transaction used to end the communications session.

4. The method in claim 1, wherein the set of transactions includes a submit transaction initiated by the first device to submit a message to the second device.

5. The method in claim 1, wherein each PDU request and confirm is independent of other PDU requests and confirms to permitting transmission of messages having a varying number of PDUs.

6. The method in claim 1, wherein the set of transactions includes a deliver transaction initiated by the first device to retrieve a message from the second device.

7. The method in claim 1, wherein the set of transactions includes a remove transaction initiated by the MED to delete a message stored in the MC.

8. The method in claim 1, wherein the set of transactions includes an inquire transaction initiated by the client to inquire about the status of an earlier submitted message.

9. The method in claim 1, wherein at least some of the transactions each include one or more parameters with each parameter specifying a particular operation to be performed with respect to a submitted message.

10. The method in claim 9, wherein the one or more parameters include a deferred delivery time when an attempt will be made to transmit the message.

11. The method in claim 10, wherein the parameters include a message expiration time after which no further attempts should be made to transmit the message.

12. The method in claim 10, wherein the parameters include a message delivery status to inform the message submitter whether a message was successfully delivered, and if not, the reason for failed delivery.

13. The method in claim 10, wherein the parameters include a confirmation parameter that indicates whether confirmation PDUs should be suppressed to facilitate transmission of long messages or transmission messages to plural destinations.

14. The method in claim 10, wherein the parameters include a transaction reference which assigned by the originator of the transaction request, the transaction reference is used to match a pending transaction request with a received transaction confirm.

15. The method in claim 10, wherein the parameters include a maximum transaction window that represents the maximum number of outstanding transaction requests pending a confirm transaction.

16. The method in claim 9, wherein the one or more parameters include plural destination addresses for transmitting a PDU to plural different destinations.

17. The method in claim 9, wherein the one or more parameters include a priority associated with a message which controls the order in which the message will be transmitted with higher priority messages being transmitted before lower priority messages.

18. The method in claim 1, wherein the encoded PDU is written in ASCII text, the delimited message in the encoded PDU being humanly readable.

19. The method in claim 18, wherein before the transmitting step the method further comprises:

translating the encoded PDU from ASCII form to binary form.

20. The method in claim 19, further comprising at the second device the steps of:

receiving binary symbols corresponding to the transmitted PDU;

converting the received binary symbols into ASCII format; and parsing the encoded PDU using the first, second, third, and fourth delimiters and PDU tags to unpack the message.

21. The method in claim 1, wherein additional information is included in the encoded PDU by encapsulating the additional information between fifth and sixth delimiters and attaching an associated tag related to the addition information to the delimited additional information.

22. The method in claim 21, wherein the delimited additional information and associated tag arc nested with the delimited message and message tag between the third and fourth delimiters.

23. The method in claim 21, further comprising the step of:

attaching a sequence tag to the nested additional information and message.

24. The method in claim 1, wherein the encoded PDU has the following format:

PDUtag{message tag{message}}, where the "{"and"}" are delimiters.

25. The method in claim 24, wherein the encoded PDU has the following format:

PDUtag{sequence tag{message tag{message}additional information tag{additional information}}}, where the "{"and"}" are delimiters.

26. The method in claim 1, wherein each tag identifies the content of the delimited information with which the tag is associated.

27. The method in claim 1, wherein each tag identifies the content of the delimited information with which the tag is associated, the PDU including a sequence tag which is associated with a sequence of primitive service elements and primitive service tags.

28. The method in claim 1, wherein the set of transactions includes a replace transaction initiated by the MED to replace a message stored in the MC.

29. The method in claim 1, further comprising:

marking some of the transactions to indicate they include plural PDUs thereby binding the plural PDUs to the same transaction.

30. A messaging system for delivering messages, comprising:
- a message handling center providing a plurality of messaging services including storing messages in electronic form and forwarding the messages to destination devices under prescribed conditions;
- a mobile radio communications network connected to the message handling center including a radio base station for communicating voice and data call information over radio channels with portable radios;
- a message service center including:
  - a telephone for receiving from a call originator a text message to be delivered to one of the portable radios, the text message including alphanumeric characters and other symbols readable by humans;
  - a message entry device connected to the message handling center used to enter the text message, the message entry device including a message processor for encoding the text message and control information related to the text message into a format where at least part of the text message is encapsulated between first and second delimiters and is associated with a message tag, and the control information is encapsulated between third and fourth delimiters to form a protocol data unit (PDU) in which the text message and control information are in human readable format, the PDU being transmitted to the message handling center,
- wherein the message handling device receives the PDU, parses out the at least part of the text message and control information using the delimiters and message tag, processes the control information and message tag, and delivers the text message to the one portable radio by way of the mobile radio network and the radio base station in accordance with the control information.

31. The messaging system in accordance with claim 30, wherein when the message handling center receives a radio text message generated by the portable radio from the mobile communications network, a processor in the message handling center encodes the radio text message and control information related to the radio text message into a format where at least part of the radio text message is encapsulated between first and second delimiters and associated with a message tag and the control information is encapsulated between third and fourth delimiters to form a protocol data unit (PDU) in which the text message and control information are in human readable format, the PDU being transmitted to the message entry device in accordance with the control information, and wherein the message entry device receives the PDU, parses out the at least part of the text message and control information using the delimiters and message tag, processes the control information and message tag.

32. The messaging system in accordance with claim 30, wherein one of the message entry device and message handling center which initiates a communications connection between the message entry device and message handling center as a client with the other of the message entry device an message handling center being the server, where either the message entry device or the message handling center may independently initiate a communications connection as the client.

33. The messaging system in accordance with claim 30, wherein a set of human-readable transactional commands used by the client and server are employed to transmit PDUs, each transactional command including a transaction request PDU sent from the client which initiates the transaction and a transaction confirm PDU sent from the server which confirms whether the transaction request is successful.

34. The messaging system in accordance with claim 30, wherein some of the transactions are marked to indicate they include plural PDUs to bind those PDUs to the same transaction.

* * * * *